(12) United States Patent
Yamada et al.

(10) Patent No.: US 8,896,252 B2
(45) Date of Patent: Nov. 25, 2014

(54) ELECTRIC MOTOR DRIVING DEVICE AND VEHICLE EQUIPPED WITH THE SAME

(75) Inventors: Eiji Yamada, Owariasahi (JP); Ryoji Mizutani, Nagoya (JP); Nobuyuki Matsui, Kasugai (JP); Takashi Kosaka, Nagoya (JP)

(73) Assignees: Toyota Jidosha Kabushiki Kaisha, Toyota-shi (JP); National University Corporation Nagoya Institute of Technology, Nagoya (JP)

( * ) Notice: Subject to any disclaimer, the term of this patent is extended or adjusted under 35 U.S.C. 154(b) by 470 days.

(21) Appl. No.: 13/081,040

(22) Filed: Apr. 6, 2011

(65) Prior Publication Data

US 2011/0241598 A1  Oct. 6, 2011

(30) Foreign Application Priority Data

Apr. 6, 2010  (JP) ................. 2010-087862

(51) Int. Cl.
*H02P 23/00* (2006.01)
*H02P 6/08* (2006.01)
*B60L 15/20* (2006.01)

(52) U.S. Cl.
CPC ........... *B60L 15/20* (2013.01); *Y02T 10/644* (2013.01); *H02P 2201/09* (2013.01); *H02P 2207/05* (2013.01); *H02P 23/009* (2013.01); *H02P 6/085* (2013.01); *H02P 2201/11* (2013.01)
USPC ....... 318/494; 318/400.26; 318/716; 318/722

(58) Field of Classification Search
USPC ............ 318/400.09, 400.26, 400.3, 711, 716, 318/717, 722, 494, 512, 521, 523
See application file for complete search history.

(56) References Cited

U.S. PATENT DOCUMENTS

| 3,996,504 | A  | * | 12/1976 | Grzebielski ............... 318/258 |
|---|---|---|---|---|
| 7,852,029 | B2 |   | 12/2010 | Kato et al. |
| 8,044,633 | B2 | * | 10/2011 | Tatematsu et al. ........... 318/801 |
| 2009/0302788 | A1 | * | 12/2009 | Mitsuda et al. ............ 318/376 |
| 2010/0071971 | A1 | * | 3/2010 | Tatematsu et al. .......... 180/65.8 |

FOREIGN PATENT DOCUMENTS

| JP | 2000354331 B1 | 5/2000 |
|---|---|---|
| JP | 2002084754 A | 3/2002 |
| JP | 2006114662 A | 4/2006 |
| JP | 2008-182879 A | 8/2008 |
| JP | 2008228534 A | 9/2008 |
| JP | 2009065758 A | 3/2009 |
| JP | 2009220684 A | 10/2009 |
| JP | 2010-068596 A | 3/2010 |

* cited by examiner

*Primary Examiner* — Bentsu Ro
*Assistant Examiner* — Thai Dinh
(74) *Attorney, Agent, or Firm* — Gifford, Krass, Sprinkle, Anderson & Citkowski, P.C.

(57) ABSTRACT

An electric motor driving device that drives an electric motor including a field winding, a rotor and a stator, wherein the rotor and the stator each form a field pole by passing a field current through the field winding, includes: a power supply device; a converter including a reactor that at least partially serves as the field winding shared with the electric motor, and configured to receive a voltage from the power supply device to carry out voltage conversion between first and second power lines and to pass the field current through the field winding during voltage conversion operation; an inverter configured to convert a direct-current power received from the converter to an alternating-current power for driving the electric motor; and a controller controlling the converter so that a current flows through the field winding in the same direction both during power running and regeneration of the electric motor.

10 Claims, 22 Drawing Sheets

<DURING POWER RUNNING>

|  |  | Q1 | Q2 | Q3 | Q4 |
|---|---|---|---|---|---|
| STATE A |  | ON | OFF | OFF | ON |
| STATE B |  | OFF | OFF | OFF | ON |
| STATE C | C-1 | OFF | OFF | ON | ON |
|  | C-2 | OFF | ON | OFF | OFF |

<DURING REGENERATION>

| | | Q1 | Q2 | Q3 | Q4 |
|---|---|---|---|---|---|
| STATE D | | OFF | ON | ON | OFF |
| STATE E | | OFF | OFF | ON | OFF |
| STATE F | F-1 | OFF | OFF | ON | ON |
| | F-2 | OFF | ON | OFF | OFF |

F I G . 23
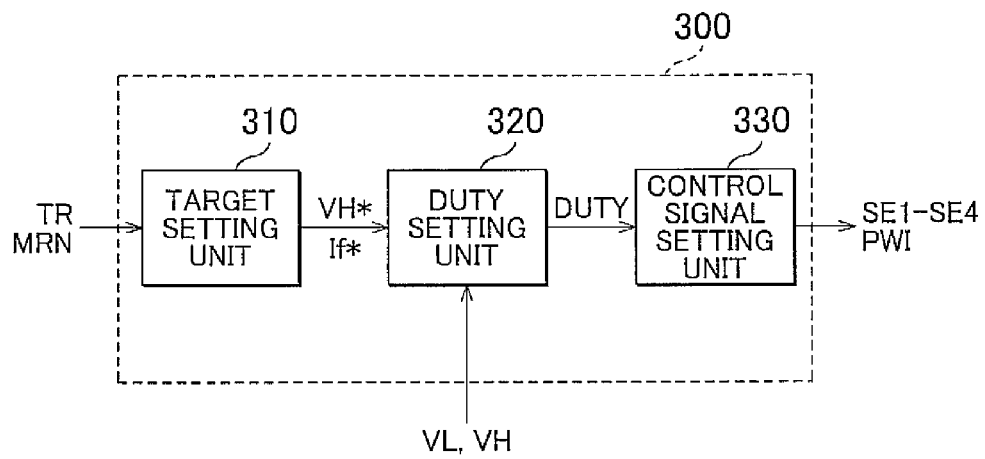
F I G . 24
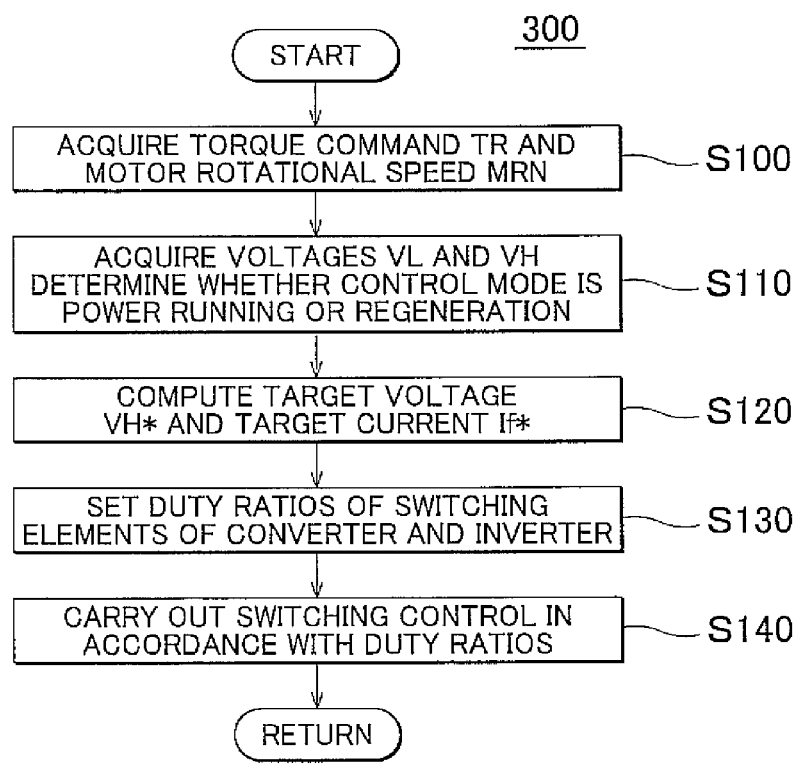

<DURING POWER RUNNING>

|  | Q1 | Q2 | Q3 |
|---|---|---|---|
| STATE A | ON | OFF | OFF |
| STATE B | OFF | OFF | OFF |
| STATE C | OFF | ON | OFF |

<DURING REGENERATION>

|         | Q1  | Q2  | Q3  |
|---------|-----|-----|-----|
| STATE D | OFF | ON  | ON  |
| STATE E | OFF | OFF | ON  |
| STATE F | OFF | ON  | OFF |

ELECTRIC MOTOR DRIVING DEVICE AND VEHICLE EQUIPPED WITH THE SAME

CROSS-REFERENCE TO RELATED APPLICATIONS

This application claims priority to Japanese Patent Application No. 2010-087862 filed on Apr. 6, 2010, which is incorporated herein by reference in its entirety, including the specification, drawings and abstract

BACKGROUND OF THE INVENTION

1. Field of the Invention

The invention relates to an electric motor driving device and a vehicle equipped with the same and, more particularly, to an electric motor driving device for driving an electric motor that is able to regulate the armature winding flux linkage.

2. Description of the Related Art

In recent years, as an environmentally friendly vehicle, a vehicle that is equipped with an electrical storage device (for example, a secondary battery, a capacitor, or the like) and that is propelled by driving force generated from electric power stored in the electrical storage device becomes a focus of attention. Such a vehicle, for example, includes an electric vehicle, a hybrid vehicle, a fuel cell electric vehicle, and the like. Then, there is a suggested technique for charging an electrical storage device equipped for these vehicles using a commercial power supply having a high power generation efficiency.

These vehicles may be provided with a rotating electrical machine (motor generator) that generates driving force for propelling the vehicle with electric power supplied from the electrical storage device at the time of start or acceleration and that generates electric power through regenerative braking during braking to store electric energy in the electrical storage device. In this way, in order to control the motor generator in response to a running condition, the vehicle is equipped with an inverter. In such a vehicle, electric power required by the inverter varies depending on a vehicle state. Then, in order to stably supply electric power required by the inverter, a converter may be provided between the electrical storage device and the inverter. The converter raises the input voltage of the inverter from the output voltage of the electrical storage device to achieve a high-power motor, and reduces a motor current with the same power to thereby make it possible to reduce the size and cost of the inverter and motor.

In addition, a permanent-magnet motor, a field winding motor, and the like, are considered as the rotating electrical machine used for such a vehicle. The permanent-magnet motor rotates by magnetic action between magnetic poles of a permanent magnet provided for a rotor and a rotating magnetic field that is generated in a stator. The field winding motor rotates by magnetic action between a component, vertical to a rotary shaft, of magnetic field that is generated in a rotor equipped with a field coil by flowing field current to the field coil and a rotating magnetic field that is generated in a stator.

Japanese Patent Application Publication No. 2008-228534 (JP-A-2008-228534) describes an electric motor driving device that is configured to be able to regulate the armature winding flux linkage of an electric motor in such a manner that a reactor of a step-up converter also serves as a field winding of the electric motor and a switching element connected in parallel with the reactor is controlled for switching.

With the electric motor driving device, the armature winding flux linkage may be varied in accordance with the state of the electric motor, so it is possible to reduce the size of the driving device and increase the power of the electric motor.

However, in the configuration described in JP-A-2008-228534, the power of the electric motor may be increased when the electric motor is driven in a power running mode; however, it does not consider increasing the power of the electric motor when the electric motor is driven in a regeneration mode. Therefore, there is a possibility that the power of the electric motor is decreased adversely during regeneration.

SUMMARY OF INVENTION

The invention provides an electric motor driving device that is used to drive an electric motor of which the armature winding flux linkage is adjustable and that is able to increase the power of the electric motor both during power running and regeneration of the electric motor, and also provides a vehicle equipped with the electric motor driving device.

A first aspect of the invention relates to an electric motor driving device that drives an electric motor that includes a field winding, a rotor and a stator, wherein the rotor and the stator each form a field pole by passing a field current through the field winding. The electric motor driving device includes: a power supply device; a converter; an inverter; and a controller. The converter includes a reactor that at least partially serves as the field winding to share the field winding with the electric motor, and is configured to receive a voltage from the power supply device to carry out voltage conversion between a first power line and a second power line and to pass the field current through the field winding during operation of the voltage conversion. The inverter is configured to receive a direct-current power from the converter and to convert the direct-current power to an alternating-current power for driving the electric motor. Then, the controller controls the converter so that a current flows through the field winding in the same direction both during power running of the electric motor and during regeneration of the electric motor.

A second aspect of the invention relates to a vehicle that includes an electric motor; an electric motor driving device that drives the electric motor; and a driving wheel. The electric motor includes a field winding, a rotor and a stator, wherein the rotor and the stator each form a field pole by passing a field current through the field winding. The driving wheel allows the vehicle to run by rotational force from the electric motor. In addition, the electric motor driving device includes a power supply device, a converter, an inverter and a controller. The converter includes a reactor that at least partially serves as the field winding to share the field winding with the electric motor, and is configured to receive a voltage from the power supply device to carry out voltage conversion between a first power line and a second power line and to pass the field current through the field winding during operation of the voltage conversion. The inverter is configured to receive a direct-current power from the converter and to convert the direct-current power to an alternating-current power for driving the electric motor. The controller controls the converter so that a current flows through the field winding in the same direction both during power running of the electric motor and during regeneration of the electric motor.

According to the aspects of the invention, in an electric motor driving device that is used to drive an electric motor of which the armature winding flux linkage is adjustable, it is possible to increase the power of the electric motor both during power running and regeneration of the electric motor.

BRIEF DESCRIPTION OF DRAWINGS

The features, advantages, and technical and industrial significance of this invention will be described below with reference to the accompanying drawings, in which like numerals denote like elements, and wherein:

FIG. 23 is a functional block diagram for illustrating switching control executed by the ECU according to the embodiment;

FIG. 24 is a flowchart for illustrating the details of switching control process executed by the ECU according to the embodiment;

DETAILED DESCRIPTION OF EMBODIMENTS

Figure 1:
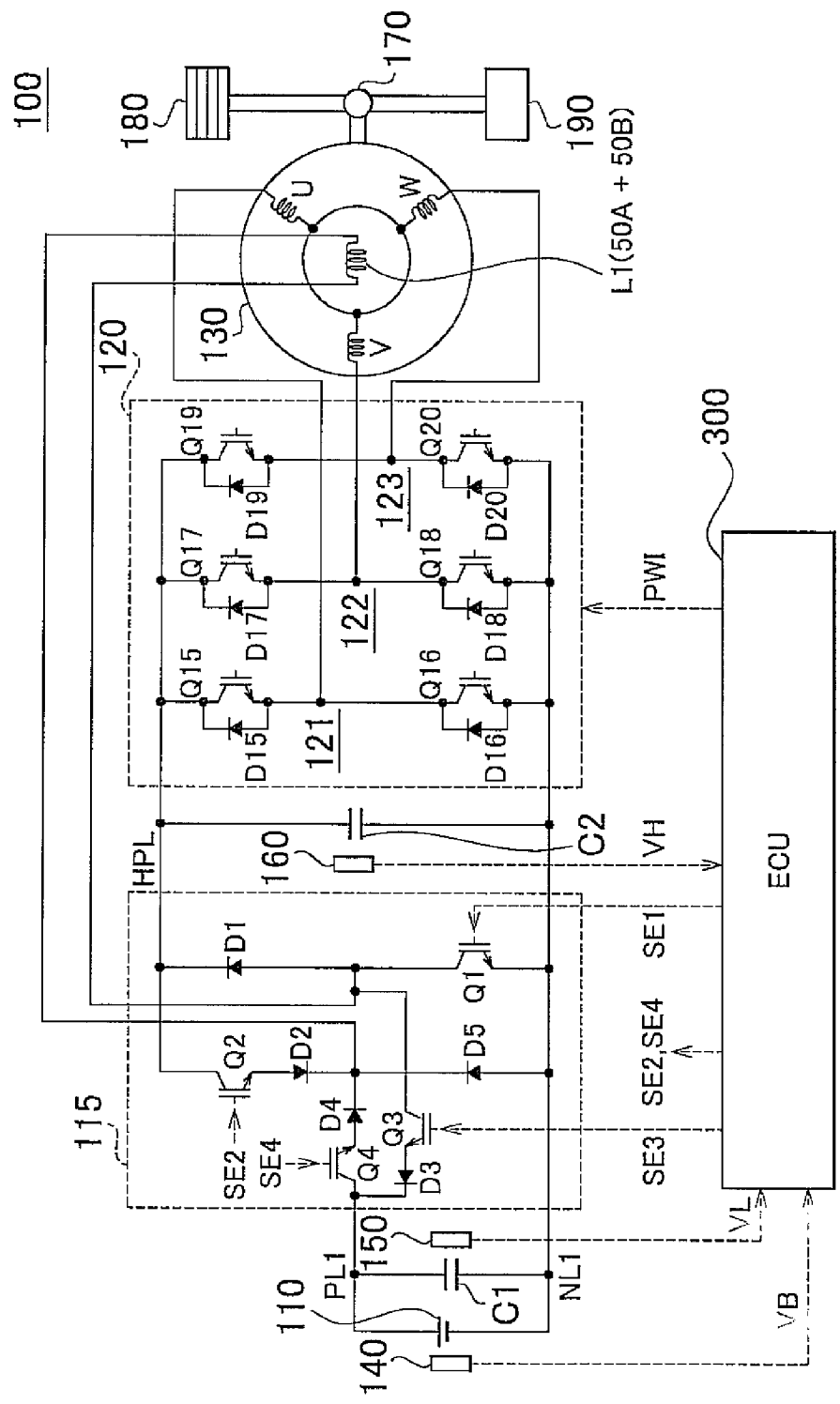
FIG. 1 is an overall block diagram of a vehicle equipped with an electric motor driving device according to an embodiment.

Hereinafter, an embodiment of the invention will be described in detail with reference to the accompanying drawings. Note that like reference numerals denote the same or corresponding components in the drawings and the description thereof is not repeated.

The configuration of an electric motor driving device according to the present embodiment will be described below. FIG. 1 is an overall block diagram of a vehicle 100 equipped with the electric motor driving device according to the present embodiment. In the present embodiment, a hybrid vehicle equipped with an engine and a motor generator is, for example, employed as the vehicle 100; however, the aspect of the invention is not limited to the hybrid vehicle, but the aspect of the invention may be applied to a vehicle that may be propelled by an electric motor driven with electric power from an electrical storage device. The vehicle 100, for example, includes an electric vehicle, a fuel cell electric vehicle, and the like, other than the hybrid vehicle. In addition, the aspect of the invention may also be applied to a device other than the vehicles as long as the device drives an electric motor.

As shown in FIG. 1, the vehicle 100 includes a power supply device 110, a converter 115, an inverter 120, a motor generator 130, voltage sensors 140, 150 and 160, a power transmission gear 170, a driving wheel 180, an engine 190, capacitors C1 and C2 and an electronic control unit (ECU) 300 that serves as a controller.

The power supply device 110 is an electrical power storage component that is configured to be chargeable and dischargeable. The power supply device 110 is, for example, configured to include a secondary battery, such as a lithium ion battery, a nickel-metal hydride battery and a lead acid battery, or an electrical storage element, such as an electric double layer capacitor.

The power supply device 110 is connected to the converter 115 via a power line PL1 and a ground line NL1. In addition, the power supply device 110 stores electric power generated by the motor generator 130. The output of the power supply device 110 is, for example, about 200 V.

The voltage sensor 140 detects the voltage VB of the power supply device 110 and then outputs the detected value to the ECU 300.

The capacitor C1 is connected between the power line PL1 and the ground line NL1. The capacitor C1 reduces variations in voltage between the power line PL1 and the ground line NL1. The voltage sensor 150 detects the voltage VL applied to the capacitor C1 and then outputs the detected value to the ECU 300.

The converter 115 includes switching elements Q1 to Q4, diodes D1 to D5 and a reactor L1.

Note that each switching element may be an insulated gate bipolar transistor (IGBT), a power metal oxide semiconductor (MOS) transistor, a power bipolar transistor, or the like. In the present embodiment, each switching element is an IGBT as an example.

The switching element Q1 and the diode D1 are connected in series between a power line HPL and the ground line NL1. The cathode of the diode D1 is connected to the power line HPL, and the anode of the diode D1 is connected to the emitter of the switching element Q1. The collector of the switching element Q1 is connected to the ground line NL1.

The reactor L1, the diode D4 and the switching element Q4 are connected in series between the power line PL1 and the connection node of the diode D1 and the switching element Q1. One end P2 of the reactor L1 is connected to the connection node of the diode D1 and the switching element Q1, and the other end P1 is connected to the cathode of the diode D4. The collector of the switching element Q4 is connected to the anode of the diode D4, and the emitter of the switching element Q4 is connected to the power line PL1.

The switching element Q2 and the diode D2 are connected in series between the power line HPL and the cathode of the diode D4 (that is, the connection node of the diode D4 and the reactor L1). The emitter of the switching element Q2 is connected to the power line HPL, and the collector of the switching element Q2 is connected to the anode of the diode D2. The cathode of the diode D2 is connected to the cathode of the diode D4.

The diode D5 is connected between the ground line NL1 and the cathode of the diode D4 so that the direction from the ground line NL1 toward the diode D4 is set as a forward direction.

The diode D3 and the switching element Q3 are connected in series with each other, and are connected in parallel with the reactor L1, the diode D4 and the switching element Q4 that are connected in series with one another. The emitter of the switching element Q3 is connected to the connection node of the diode D1 and the switching element Q1, and the collector of the switching element Q3 is connected to the anode of the diode D3. The cathode of the diode D3 is connected to the power line PL1.

Note that, although not shown in the drawing, diodes may be connected in antiparallel with the switching elements Q1 to Q4, respectively. The switching elements Q1 to Q4 constitute an example of "switching unit" according to the aspect of the invention.

The switching elements Q1 to Q4 are respectively controlled to turn on or off by control signals SE1 to SE4, from the ECU 300.

The switching element Q1, the diode D1 and the reactor L1 are connected as described above to operate as a step-up chopper circuit. Then, the voltage of the power line PL1 is stepped up in accordance with the duty ratio that is the on-time ratio of the switching element Q1, and the stepped-up voltage is output to the power line HPL. Conversely, the switching element Q2, the reactor L1 and the diode D2 operate as a step-down chopper circuit. Then, the voltage of the power line HPL is stepped down in accordance with the duty ratio of the switching element Q2, and the stepped-down voltage is output to the power line PL1.

That is, the converter 115 steps up an electric power output from the power supply device 110, and then supplies the electric power for driving the motor generator 130 to the inverter 120. In addition, the converter 115 steps down an electric power generated by rotational force of the motor generator 130, and then supplies the charging electric power to the power supply device 110.

In addition, in the present embodiment, as shown in FIG. 1, the reactor L1 is also used as the field winding of the motor generator 130. In this way, the reactor L1 of the converter 115 is also used as the field winding of the motor generator 130, and a current that flows through the reactor L1 (that is, field current) is regulated. By so doing, as will be described later, it is possible to change the output torque of the motor generator 130.

In addition, by controlling the switching elements Q3 and Q4, the direction and magnitude of a current that flows through the reactor L1 may be regulated.

A capacitor C2 is connected between the power line HPL and the ground line NL1. The capacitor C2 reduces variations in Voltage between the power line HPL and the ground line NL1. The voltage sensor 160 detects the voltage VH applied to the capacitor C2, that is, the voltage supplied to the inverter 120 (hereinafter, referred to as "system voltage"), and then outputs the detected value to the ECU 300.

The inverter 120 is connected to the converter 115 via the power line HPL and the ground line NL1. The inverter 120 includes a U-phase arm 121, a V-phase arm 122 and a W-phase arm 123 that are provided in parallel with one another between the power line HPL and the ground line NL1. The arms of the respective phases each are configured to include switching elements that are connected in series with each other between the power line HPL and the ground line NL1. For example, the U-phase arm 121 includes switching elements Q15 and Q16, the V-phase arm 122 includes switching elements Q17 and Q18, and the W-phase arm 123 includes switching elements Q19 and Q20. In addition, antiparallel diodes D15 to D20 are respectively connected to the switching elements Q15 to Q20. The on-off state of each of the switching elements Q15 to Q20 is controlled by a switching control signal PWI from the ECU 300.

The connection node of the switching elements in each of the arms of the inverter 120 is connected to an end of a coil of a corresponding phase of the motor generator 130. That is, the motor generator 130 is a three-phase synchronous motor, and one ends of three U, V and W-phase coils are connected in common to a neutral point. The other end of the U-phase coil is connected to the connection node of the switching elements Q15 and Q16, the other end of the V-phase coil is connected to the connection node of the switching elements Q17 and Q18, and the other end of the W-phase coil is connected to the connection node of the switching elements Q19 and Q20. The inverter 120 bidirectionally converts an electric power between the inverter 120 and the motor generator 130 through switching control of the switching elements Q15 to Q20 in response to the switching control signal PWI from the ECU 300.

Specifically, the inverter 120 converts a direct-current voltage received from the power line HPL to a three-phase alternating-current voltage in accordance with switching control executed by the ECU 300, and then outputs the converted three-phase alternating-current voltage to the motor generator 130. By so doing, the motor generator 130 is driven to generate specified torque.

In addition, during regenerative braking of the vehicle 100, the inverter 120 converts a three-phase alternating-current voltage generated by the motor generator 130 to a direct-current voltage in accordance with switching control executed by the ECU 300, and then outputs the converted direct-current voltage to the power line HPL.

Note that the regenerative braking here includes braking attended with regeneration when a foot brake is operated by a driver who drives the vehicle 100 and deceleration of a vehicle speed (or stopping acceleration) while regenerating electric power by releasing an accelerator pedal during running although the foot brake is not operated.

The motor generator 130 is a three-phase alternating-current rotating electrical machine as described above, and is, for example, a permanent-magnet synchronous motor that is provided with a rotor in which a permanent magnet is buried.

The output torque of the motor generator 130 is transmitted to the driving wheel 180 via the power transmission gear 170 for propelling the vehicle 100. The power transmission gear 170 is formed of a reduction gear or a power split mechanism. The motor generator 130 is able to generate an electric power by rotational force of the driving wheel 180 during regenerative braking operation of the vehicle 100. Then, the generated electric power is converted by the inverter 120 to a charging electric power for charging the power supply device 110.

In addition, the motor generator 130 is coupled to the engine 190 via the power transmission gear 170. Then, required vehicle driving force is generated by coordinately operating the motor generator 130 and the engine 190. In this case, it is possible to charge the power supply device 110 using an electric power generated by rotation of the engine 190.

Furthermore, the motor generator 130 includes a field winding. The field winding is also used as the reactor L1 of the converter 115 as described above. Then, the motor generator 130 is able to generate large torque in such a manner that a field current that flows through the field winding is controlled by the Converter 115. The detailed structure of the motor generator 130 will be described later with reference to FIG. 2 to FIG. 5.

Note that FIG. 1 shows a configuration that includes only one pair of the inverter and the motor generator; however, the number of pairs of inverter and motor generator is not limited to one, but it may be a configuration that includes multiple pairs of inverter and motor generator.

The ECU 300 generates and outputs control signals for controlling the converter 115, the inverter 120, and the like. In addition, the ECU 300 computes the state of charge (hereinafter, referred to as "SOC") of the power supply device 110 on the basis of the voltage VB of the power supply device 110 from the voltage sensor 140 and the current of the power supply device 110, detected by a current sensor (not shown).

Note that, in FIG. 1, the ECU 300 is formed of one controller; instead, for example, the ECU 300 may be formed of controllers that are provided separately for functions or controlled devices.

Next, the configuration of the motor generator 130 that serves as an electric motor will be described with reference to FIG. 2 to FIG. 5.

Figure 2:
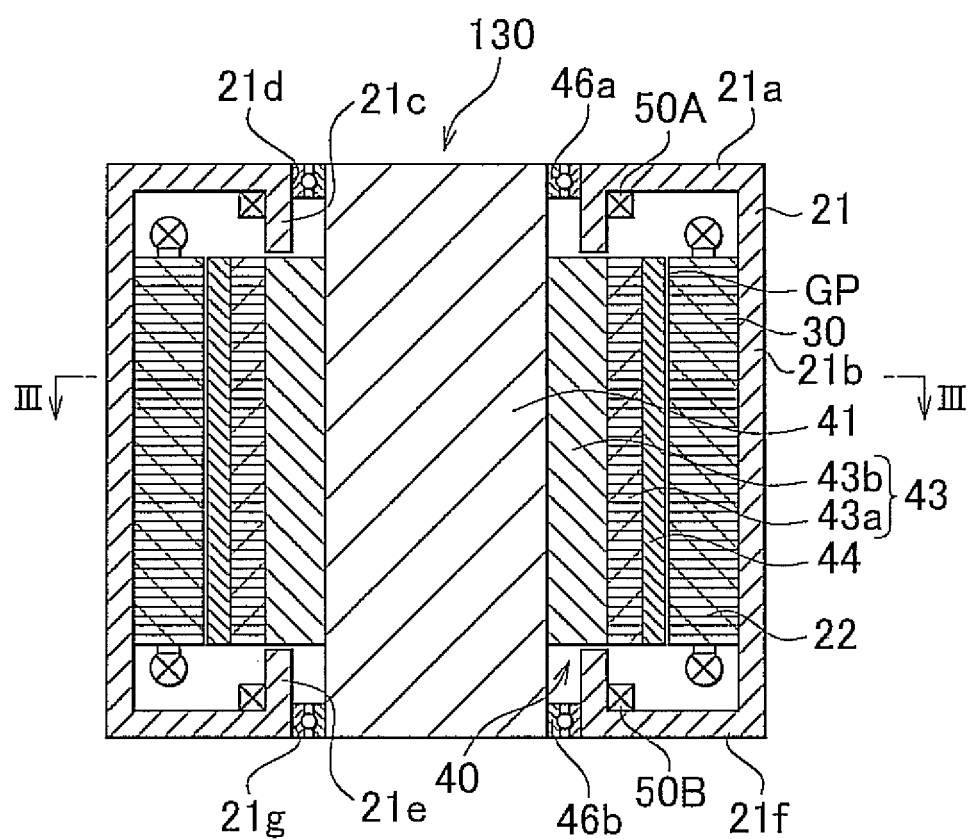
FIG. 2 is a side cross-sectional view of a motor generator shown in FIG. 1.
Figure 3:
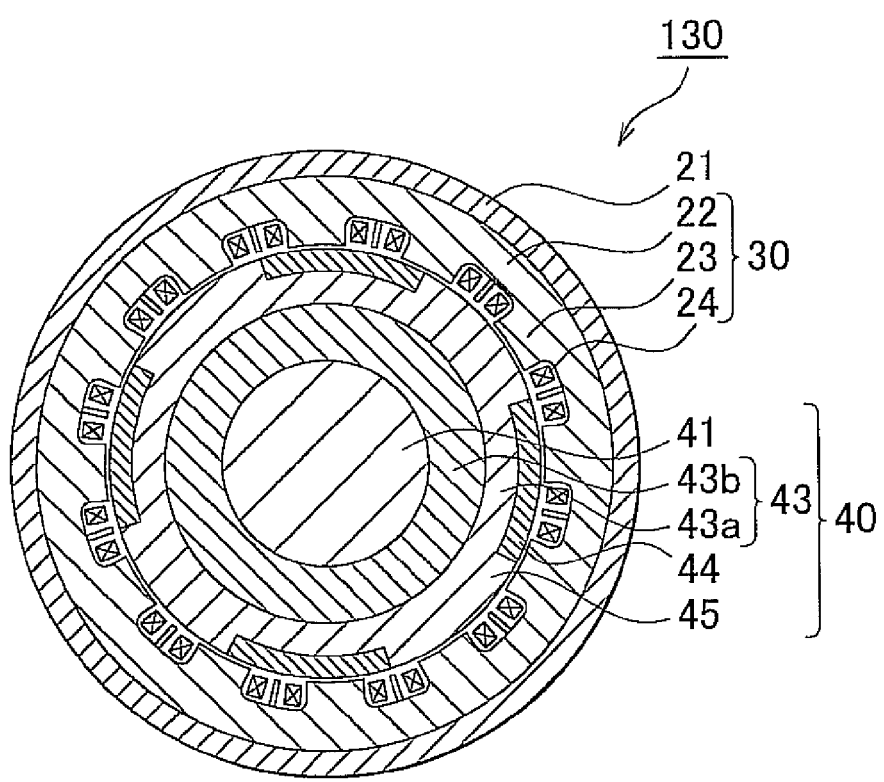
FIG. 3 is a cross-sectional view taken along the line in FIG. 2.

FIG. 2 is a side cross-sectional view of the motor generator 130 shown in FIG. 1. FIG. 3 is a cross-sectional view taken along the line in FIG. 2.

As shown in FIG. 2 and FIG. 3, the motor generator 130 includes a rotary shaft 41, a rotor 40, a field yoke 21 and field coils 50A and 50B. The rotor 40 is secured to the rotary shaft 41. The field yoke 21 is provided around a stator 30.

An air gap GP is provided between the rotor 40 and the stator 30. Thus, the rotor 40 and the stator 30 are arranged so as to be radially slightly distanced from each other.

The rotor 40 includes a rotor core 43 and magnets 44. The rotor core 43 is secured to the rotary shaft 41. The magnets 44 are provided on the outer surface of the rotor core 43.

The rotor core 43 includes a cylindrical laminated rotor core 43a and a dust rotor core 43b provided radially inside the laminated rotor core 43a. The dust rotor core 43b is formed of an integrated magnetic material, and is specifically formed of a powder molding magnetic substance (soft magnetic composites (SMC)).

The laminated rotor core 43a is formed so that a plurality of magnetic steel sheets are laminated in an axial direction, and the magnetic resistance in the axial direction is larger than the magnetic resistance in the radial direction or in the circumferential direction because of gaps formed between the adjacent magnetic steel sheets. Therefore, inside the laminated rotor core 43a, magnetic lines of force from the magnets are hard to flow in the axial direction and are easy to flow in the radial direction and in the circumferential direction.

In contrast to this, the dust rotor core 43b is formed of a powder molding magnetic substance, so the magnetic resistance in the axial direction is smaller than the magnetic resistance in the axial direction of the laminated rotor core 43a. Therefore, magnetic lines of force easily flow in the axial direction inside the dust rotor core 43b.

Then, as shown in FIG. 3, a plurality of rotor teeth (first salient pole portions) 45 are formed on the outer surface of the laminated rotor core 43a. The plurality of rotor teeth 45 are provided at equidistant intervals and protrude outward in the radial direction.

The magnets 44 are provided between the adjacent rotor teeth 45. The outer surface of the rotor teeth 45 and the outer surface of the magnets 44 both are located along the same imaginary circumference having a center at the central axis of the rotary shaft 41. That is, the magnets 44 are provided next to the rotor teeth 45 in the circumferential direction of the rotor 40 and are provided so that the outer peripheral surfaces are flush with each other.

The north pole (first magnetic pole) and south pole (second magnetic pole) of each magnet 44 are arranged in the radial direction of the rotor 40. Note that, in the present embodiment, the north pole of each magnet 44 is arranged radially outward of the rotor core 43 and the south pole of each magnet 44 is arranged radially inward of the rotor core 43; however, the poles of each magnet may be arranged inversely.

The stator 30 includes a stator core 22, a plurality of stator teeth (second salient pole portions) 23 and a coil 24. The stator core 22 is formed in a hollow cylindrical shape. The plurality of stator teeth 23 are formed on the inner surface of the stator core 22 and protrude radially inward of the stator core 22. The coil 24 is wound around the stator teeth 23.

The stator teeth 23 are formed at equidistant intervals in the circumferential direction. Part of the coil 24 constitutes the U-phase coil, part of the remaining coil 24 constitutes the V-phase coil, and the remaining coil 24 constitutes the W-phase coil. Then, the U-phase coil, the V-phase coil and the W-phase coil have terminals at one ends, and the terminals are respectively connected to three-phase cables (U-phase cable, V-phase cable and W-phase cable) of the inverter (not shown). Furthermore, the U-phase coil, the V-phase coil and the W-phase coil have the other ends that are connected in common to a point that serves as a neutral point.

When the ECU 300 (FIG. 1) receives a torque command value from an ECU provided outside the electric motor driving device, the ECU 300 controls currents (motor driving currents) flowing to the respective phases of the motor generator 130 so as to output torque specified by the received torque command value. The controlled motor driving currents are supplied to the coil 24 via the three-phase cables.

The stator core 22 is formed so that a plurality of magnetic steel sheets are laminated, so an air gap is formed between the adjacent magnetic steel sheets. Therefore, the magnetic resistance of the stator core 22 in the radial direction and in the circumferential direction is smaller than the magnetic resistance in the axial direction. By so doing, magnetic lines of force entering the stator core 22 are easy to flow in the circumferential direction and radial direction of the stator core 22 and are hard to flow in the axial direction.

As shown in FIG. 2, the field yoke 21 includes top plate portions 21a and 21f, a cylindrical side wall portion 21b and cylindrical protruding portions 21c and 21e. The top plate portions 21a and 21f are arranged away from both ends of the stator 30 and rotor 40 in the axial direction. The side wall portion 21b is formed on the peripheral portions of the top plate portions 21a and 21f. The protruding portions 21c and 21e are respectively formed on the top plate portions 21a and 21f.

The top plate portions 21a and 21f respectively have through holes 21d and 21g at their centers, and the rotary shaft 41 is inserted in the through holes 21d and 21g via bearings 46a and 46b. The side wall portion 21b is secured to the outer surface of the stator core 22.

The field yoke 21 is formed of an integrated magnetic material, and is specifically formed of a powder molding magnetic substance (SMC) that is a three-dimensional completely isotropic material. Therefore, the magnetic resistance of the field yoke 21 in the axial direction is smaller than the magnetic resistance of the stator core 22 in the axial direction.

The protruding portions 21c and 21e are respectively formed on the inner surfaces of the top plate portions 21a and 21f, and protrude toward axial ends of the dust rotor core 43b. Then, the ends of the protruding portions 21c and 21e are close to the ends of the dust rotor core 43b so that magnetic lines of force are not interrupted between the ends of the protruding portions 21c and 21e and the ends of the dust rotor core 43b.

Therefore, it is possible to form a magnetic circuit (first magnetic circuit) that reaches the field yoke 21 from the surfaces of the magnets 44 via the air gap GP and the stator core 22, that flows through the field yoke 21 in the axial direction, that enters the dust rotor core 43b from the protruding portions 21c and 21e and that returns to the south poles of the magnets 44.

In the magnetic circuit, the magnetic resistance of the stator core 22 in the radial direction is reduced, the magnetic resistance inside the field yoke 21 is reduced, and, furthermore, the magnetic resistance of the dust rotor core 43b is also reduced, so a loss of magnetic energy may be reduced.

Note that, in the example shown in FIG. 2, the cylindrical protruding portions 21c and 21e are formed in the field yoke 21; instead, cylindrical protruding portions may be provided at the ends of the dust rotor core 43b.

The field coils (windings) 50A and 50B are respectively wound around the outer peripheral surfaces of the protruding portions 21c and 21e. By passing a current through the field coils 50A and 50B, for example, the north pole magnetism may be imparted to the ends of the protruding portions 21c and 21e, and the south pole magnetism may be imparted to the side wall portion 21b. Alternatively, the south pole magnetism may be imparted to the ends of the protruding portions 21c and 21e, and the north pole magnetism may be imparted to the side wall portion 21b. Note that, in the present embodiment, the field coils 50A and 50B are provided on the protruding portions 21c and 21e of the field yoke 21; however, the locations of the field coils 50A and 50B are not limited as long as the field coils 50A and 50B are provided on the field yoke 21. Here, the fact that the field coil 50 (hereinafter, the field coils 50A and 50B are collectively referred to as "field coil 50") is provided on the field yoke 21 not only includes the case were the field coil 50 is in contact with the surface of the field yoke 21 but also the case where the field coil 50 is distanced from the surface of the field yoke 21 as long as it is possible to control the flow of magnetic lines of force in the field yoke 21. Note that, in the present embodiment, the field coils 50A and S0B are connected in series with each other to constitute the reactor L1 shown in FIG. 1.

Figure 4:
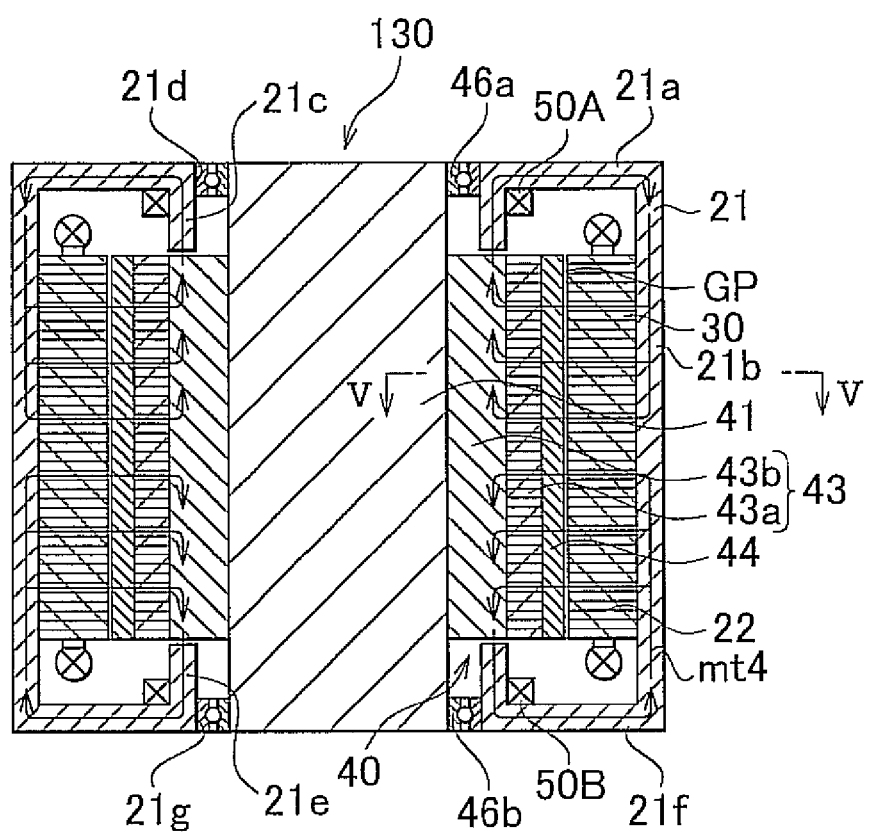
FIG. 4 is a side cross-sectional view of the motor generator shown in FIG. 2 in a state where a current is supplied to a field coil.
Figure 5:
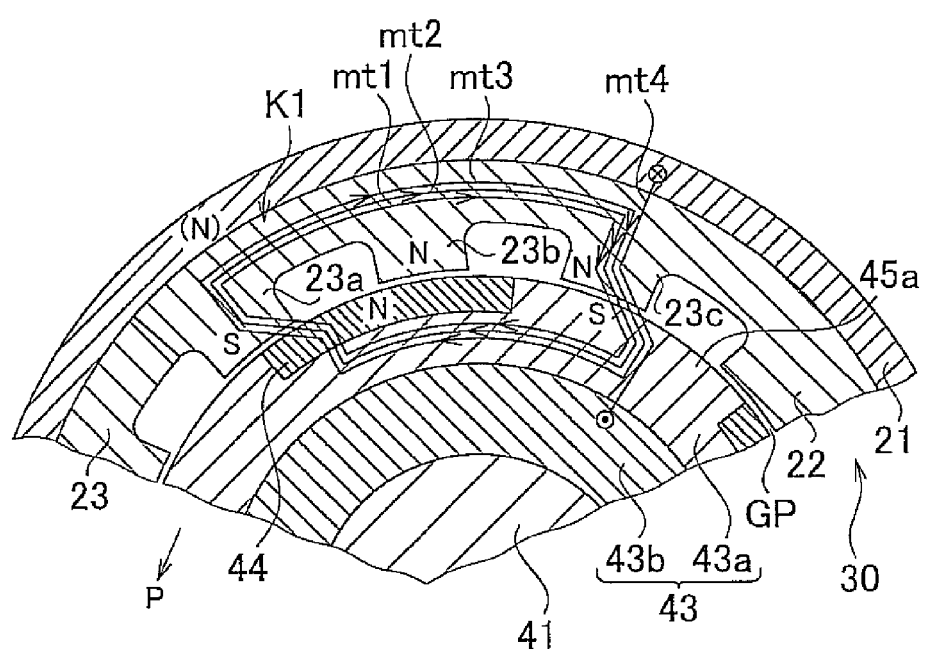
FIG. 5 is a cross-sectional view taken along the line V-V in FIG. 4.

The operation of the thus configured motor generator 130 will be described with reference to FIG. 4 and FIG. 5. FIG. 4 is a side cross-sectional view of the motor generator 130 in a state where the field coil 50 shown in FIG. 2 is supplied with a current. FIG. 5 is a cross-sectional view taken along the line V-V in FIG. 4.

As shown in FIG. 4, by passing a current through the field coil 50, a magnetic line of force mt4 is generated. The magnetic line of force mt4 passes through the top plate portion 21a of the field yoke 21, and enters the stator core 22 from the side wall portion 21b. Then, the magnetic line of force mt4 enters the rotor core 43 via the air gap GP, and advances in the axial direction inside the rotor core 43. After that, the magnetic line of force mt4 enters the field yoke 21 from the axial end surface of the rotor core 43 via the end surface of the protruding portion 21c. Note that this also applies to the side of the protruding portion 21e.

By generating the above magnetic circuit, the protruding portions 21c and 21e of the field yoke 21 assume south pole magnetism, and the side wall portion 21b of the field yoke 21 assumes north pole magnetism.

In FIG. 5, stator teeth 23a are arranged at the end of the magnet 44 forward in the rotational direction P of the rotor 40, and the center of the outer principal surface of the magnet 44 in the circumferential direction is located rearward in the rotational direction P from the center of the end surface of the stator teeth 23a in the circumferential direction. The inward end surface of the stator teeth 23a is set as a south pole.

Therefore, magnetic lines of force mt1 to mt4 that exit from the outer principal surface of the magnet 44 are inclined forward in the rotational direction P as they go radially outward, and then reach the end surface of the stator teeth 23a. In this way, magnetic paths of the magnetic lines of force mt1 to mt3 between the magnet 44 and the stator teeth 23a are inclined and elongated, so stress is applied to the rotor 40 so as to minimize the magnetic paths. That is, the magnet 44 is pulled toward the stator teeth 23a.

Stator teeth 23b are provided rearward in the rotational direction P of the rotor 40 with respect to the stator teeth 23a. The stator teeth 23b face around the center of the magnet 44. The inward end surface of the stator teeth 23b is set as a north pole, and repels the magnet 44.

Therefore, the magnetic lines of force mt1 to mt3 that enter the stator core 22 from the stator teeth 23a advance inside the stator core 22 in the circumferential direction. At this time, as described above, because of the passage of a current through the field coil 50, the inner wall surface of the side wall portion 21b is set as a north pole. Therefore, the magnetic lines of force mt1 to mt3 from the magnet 44 enter the stator core 22 from the end surface of the stator teeth 23a and then advance along the circumferential direction of the stator core 22. That is, after the magnetic lines of force mt1 to mt3 have reached the stator teeth 23a, the magnetic lines of force mt1 to mt3 are prevented from radially advancing through the stator core 22 to reach the field yoke 21.

Then, stator teeth 23c are provided rearward in the rotational direction P of the rotor 40 with respect to the stator teeth 23b, and the inward end surface of the stator teeth 23c is set as a north pole. The stator teeth 23c face rotor teeth 45a.

Here, because the outer surface of the magnet 44 adjacent to the rotor teeth 45a is set as a north pole, the magnetic lines of force mt1 to mt3 advancing from the end surface of the stator teeth 23c toward the rotor teeth 45a receive the influence of the north pole of the magnet 44 and then advance toward the rotor teeth 45a so as to be inclined rearward in the rotational direction P. Then, the rotor teeth 45a are appropriately attracted toward the stator teeth 23c so as to minimize the path length.

In this way, the magnetic lines of force mt1 to mt3 form a magnetic circuit K1. The magnetic circuit K1 reaches the stator teeth 23a from the magnet 44 via the air gap GP, passes inside the stator core 22 in the circumferential direction, and then reaches the inside of the laminated rotor core 43a from the stator teeth 23c via the air gap GP, and returns to the magnet 44 again.

On the other hand, in a state where no current is supplied to the field coil 50, part of the magnetic lines of force mt1 to mt3 (for example, the magnetic line of force mt3) from the magnet 44 reaches the stator teeth 23a and radially advances through the stator core 22 to the field yoke 21. Then, the magnetic line of force mt3 forms a magnetic circuit K2 (not shown). The magnetic circuit K2 passes through the field yoke 21 in the axial direction, enters the dust rotor core 43b from the protruding portion 21c and returns to the magnet 44 again.

That is, by passing a current through the field coil 50, it is possible to prevent the magnetic lines of force mt1 to mt3 exiting from the magnet 44 from passing through the magnetic circuit K2, and to control the magnetic lines of force mt1 to mt3 so as to pass through the magnetic circuit K1. By so doing, the percentage of magnetic flux that passes through the magnetic circuit K1, which greatly contributes to generation of torque, with respect to constant magnetic flux produced from the magnet 44 may be increased, so it is possible to obtain large torque.

Furthermore, as shown in FIG. 5, the magnetic line of force mt4 generated by the field coil 50 passes through a path that is part of the magnetic circuit K1 and that reaches the rotor teeth 45a from the stator teeth 23c, and then reaches the dust rotor core 43b. Therefore, the magnetic line of force mt4 also contributes to generation of torque.

Figure 6:
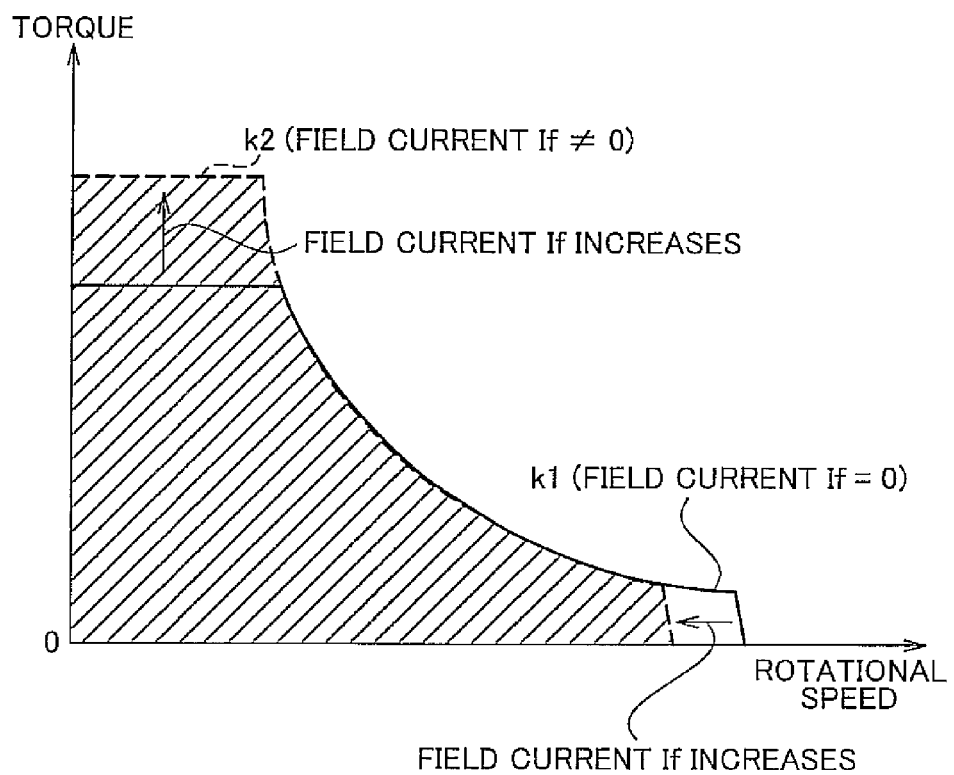
FIG. 6 is a graph that shows an example of the relationship between the torque and rotational speed of the motor generator.

As described above, by passing a current through the field coil 50, the motor generator 130 is subjected to "strong magnetic field control". FIG. 6 is a graph that shows the relationship between the torque and rotational speed of the motor generator 130.

In FIG. 6, the solid curve k1 indicates the output characteristic of the motor generator 130 in a state where no current is supplied to the field coil 50 (field current If=0). On the other hand, the broken curve k2 indicates the output characteristic of the electric motor in a state where a current is supplied to the field coil 50 (field current If≈0).

As shown in FIG. 6, when a current is passed through the field coil 50 to subject the motor generator 130 to strong magnetic field control, it appears that torque increases in a range in which the rotational speed is low. On the other hand, the voltage increases as the magnetic field increases in strength, so the operable maximum rotational speed decreases.

Note that by inverting the direction of a current flowing through the field coil 50, the motor generator 130 may be subjected to "weak magnetic field control". In this case, by passing a current through the field coil 50, the percentage of magnetic flux that passes through the magnetic circuit K1 decreases.

In addition, according to the present embodiment, within the outer peripheral surface of the rotor 40, the surfaces of the magnets 44 function as regions that emit magnetic lines of force, and the rotor teeth 45 function as regions that introduce the emitted magnetic lines of force. Then, because the magnets 44 and the rotor teeth 45 extend in the axial direction of the rotor 40, the outer peripheral surface of the rotor 40 is formed of the surfaces of the magnets 44 and the surfaces of the rotor teeth 45. Therefore, substantially all the outer peripheral surfaces of the rotor teeth 45 may function as the regions from which the magnetic lines of force are emitted and the regions into which the magnetic lines of force are introduced, so it is possible to improve the usage efficiency of the outer peripheral surface of the rotor 40. As a result, even the small rotor 40 is able to emit or introduce required magnetic flux, so the rotor 40 may be made compact.

Next, a comparative example to the present embodiment will be described with reference to FIG. 7.

Figure 7:
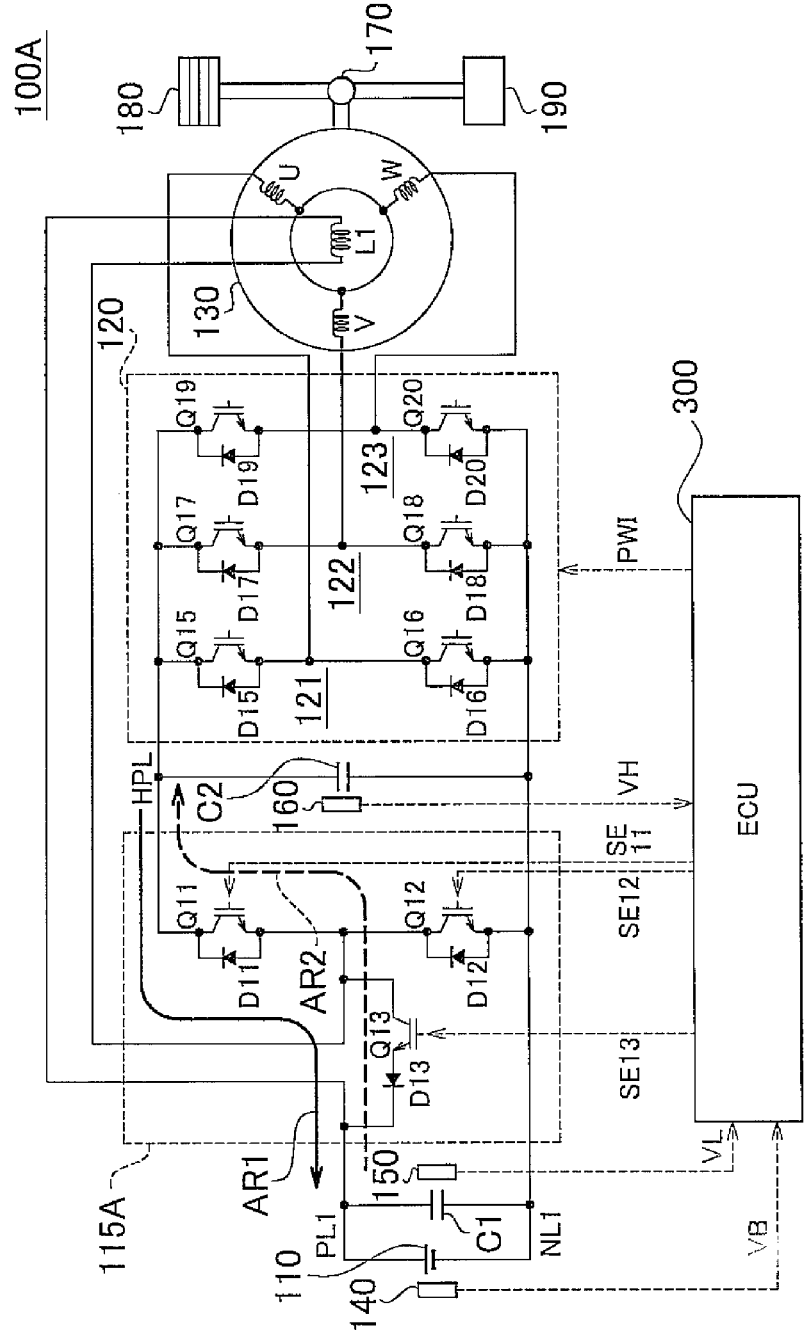
FIG. 7 is an overall block diagram of a vehicle equipped with an electric motor driving device according to a related art as a comparative example.

FIG. 7 is an overall block diagram of a vehicle 100A equipped with an electric motor driving device according to a related art as the comparative example to the present embodiment. The configuration of the comparative example is the configuration of the electric motor driving device described in JP-A-2008-228534. Note that, in FIG. 7, the converter 115 in FIG. 1 is replaced with a converter 115A. In FIG. 7, the description of components that overlap those of FIG. 1 is not repeated.

As shown in FIG. 7, the converter 115A includes switching elements Q11 to Q13, diodes D11 to D13 and a reactor L1. As well as FIG. 1, the reactor L1 is also used as the field winding of the motor generator 130.

The switching elements Q11 and Q12 are connected in series with each other between the power line HPL and the ground line NL1. The diodes D11 and D12 are respectively connected in antiparallel with the switching elements Q11 and Q12.

The reactor L1 is connected to the connection node of the switching elements Q11 and Q12 and the power line PL1.

The switching element Q13 and the diode D13 are connected in series with each other, and are connected in parallel with the reactor L1. The emitter of the switching element Q13 is connected to the connection node of the switching elements Q11 and Q12, and the collector of the switching element Q13 is connected to the anode of the diode D13. The cathode of the diode D13 is connected to the power line PL1.

With the above configuration, the converter 115A is able to perform bidirectional voltage conversion, that is, step-up operation from the power line PL1 to the power line HPL and step-down operation from the power line HPL to the power line PL1. In addition, by controlling the switching element Q13, a current that flows through the reactor L1, that is, the field current of the motor generator 130, may be regulated.

In the thus configured converter 115A, during power running, a current flows in the direction indicated by the broken arrow AR2 in FIG. 7. On the other hand, during regeneration, a current flows in the direction indicated by the solid arrow AR1. Thus, the direction in which a current flows through the reactor L1 is opposite between during power running and during regeneration. Then, during regeneration, the direction of magnetic lines of force generated by the field current and described in FIG. 4 and FIG. 5 is inverted, so part of magnetic lines of force from the magnets are cancelled to thereby enter a "weak magnetic field" state.

Figure 8:
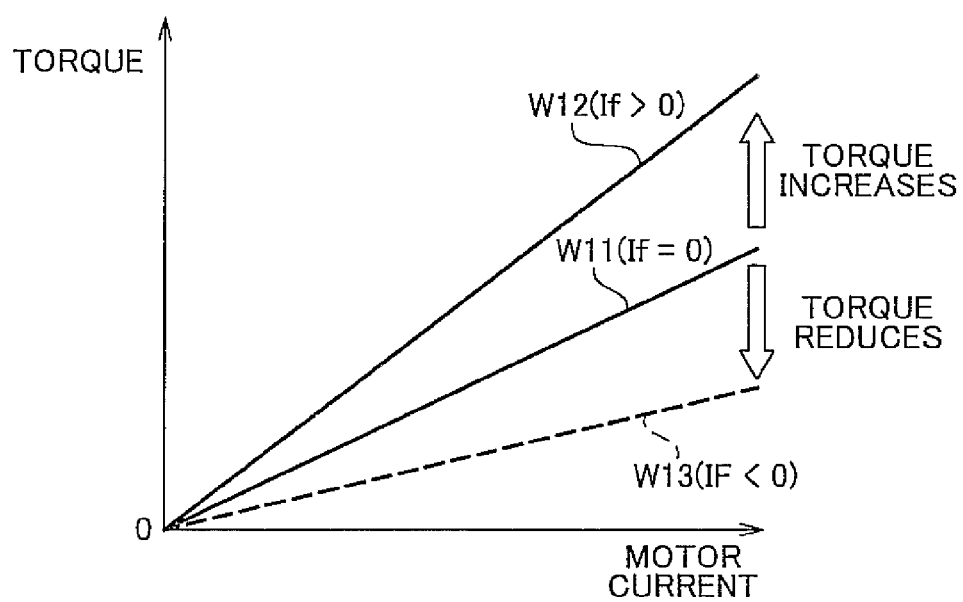
FIG. 8 is a graph for illustrating the relationship between a variation in field current and a change in torque.
Figure 9:
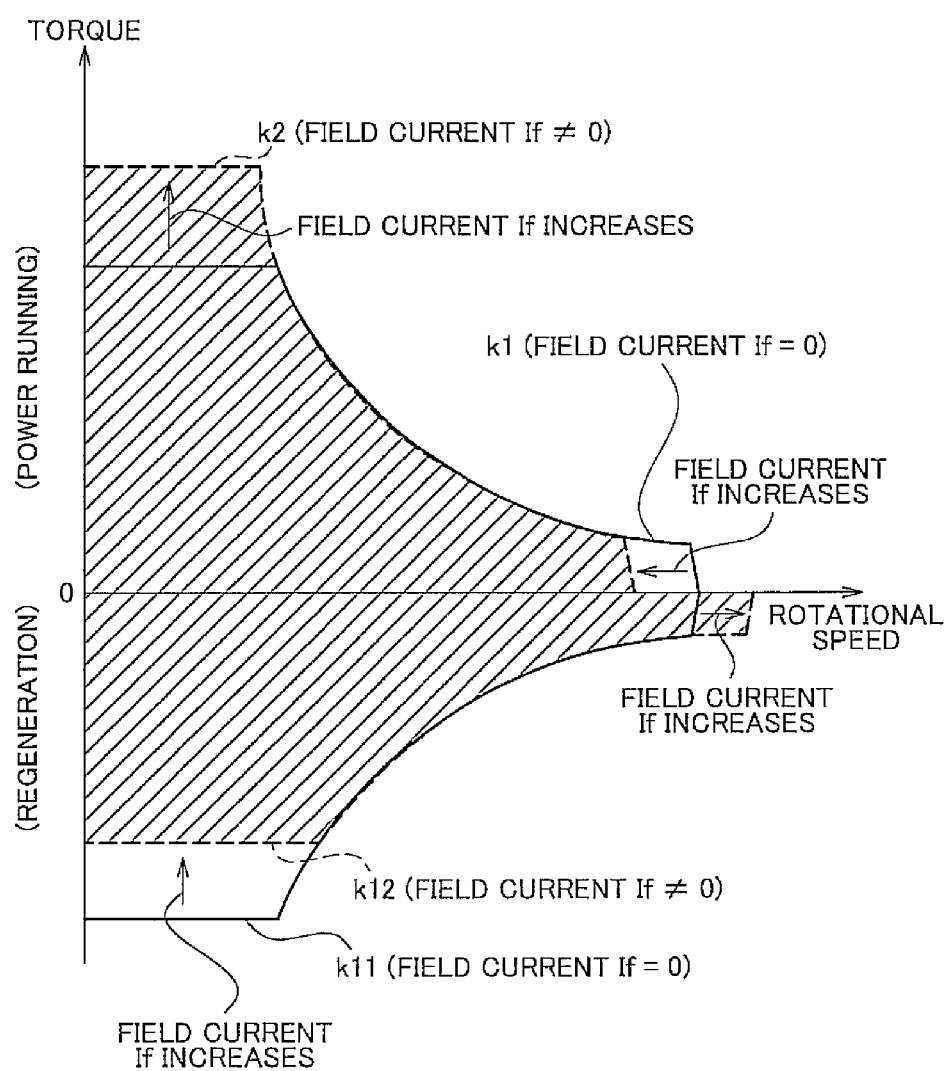
FIG. 9 is a graph that shows an example of the relationship between the torque and rotational speed of the motor generator according to the comparative example.

As shown in FIG. 8, higher torque may be output with the same motor current when the field current is positive (curve W12 in FIG. 8) than when no field current is supplied (curve W11 in FIG. 8); whereas, on the contrary, generated torque reduces when the field current is negative (curve W13 in FIG. 8) than when no field current is supplied (curve W11 in FIG. 8). That is, as shown in FIG. 9, the torque of the motor generator 130 may be increased in the low rotational speed range when the field current is increased during power running; on the contrary, the torque of the motor generator 130 may be reduced but it is difficult to increase the torque of the motor generator 130 in the low rotational speed range when the field current is increased in the negative direction during regeneration. For this reason, for example, there is a possibility that desired deceleration torque cannot be generated during deceleration to extend a distance or a period of time for deceleration or the advantageous effect of reduction of loss cannot be exercised because of torque reduction.

Then, in the present embodiment, in the electric motor control device that has the configuration shown in FIG. 1, the switching elements Q1 to Q4 are controlled by the ECU 300 to thereby make it possible to increase torque generated by the motor generator 130 both during power running and during regeneration. The control structure of the electric motor control device according to the present embodiment will be described below. Referring back to FIG. 1, the ECU 300 includes a central processing unit (CPU), a storage device and an input/output buffer (which are not shown in FIG. 1). The ECU 300 inputs signals from sensors, or the like, and outputs control signals to various devices to thereby control the vehicle 100 and various devices. Note that these controls are not limited to software processing but they may be processed by exclusive hardware (electronic circuit).

The ECU 300 generates control signals SE1 to SE4 and PWI for executing switching control over the converter 115 and the inverter 120 so that the motor generator 130 operates in accordance with a motor command input from the higher-level ECU (not shown) to thereby control electric power conversion operation of the converter 115 and the inverter 120.

Furthermore, as described above, the ECU 300 controls the switching elements of the converter 115 to thereby control a current that flows through the field coil 50 of the motor generator 130.

In the present embodiment, the ECU 300 sets the target value VH* of the system voltage VH in accordance with the operating state of the motor generator 130, and sets the target value of the field current If. Then, the duty ratios of the switching elements Q1 to Q4 are set on the basis of the target values VH* and If*. Hereinafter, the operation of setting the duty ratios of the switching elements Q1 to Q4 will be described.

FIG. 10 to FIG. 21 are views for illustrating switching control of the switching elements Q1 to Q4, executed by the ECU 300. The operation during power running will be described with reference to FIG. 10 to FIG. 15, and the operation during regeneration will be described with reference to FIG. 16 to FIG. 21.

First, the operation during power running will be described. FIG. 10 to FIG. 13 are views that show the operating statuses of the switching elements Q1 to Q4 during power running and a current that flows through the circuit at that time. During power running, as shown by the time chart of FIG. 14, the pattern from a state A to a state C is executed as one control period. Note that two patterns, that is, a state C-1 (FIG. 12) and a state C-2 (FIG. 13), are shown as the state C, and any one of these two patterns may be employed. The statuses of the switching elements Q1 to Q4 in each state are shown in FIG. 15.

Figure 10:
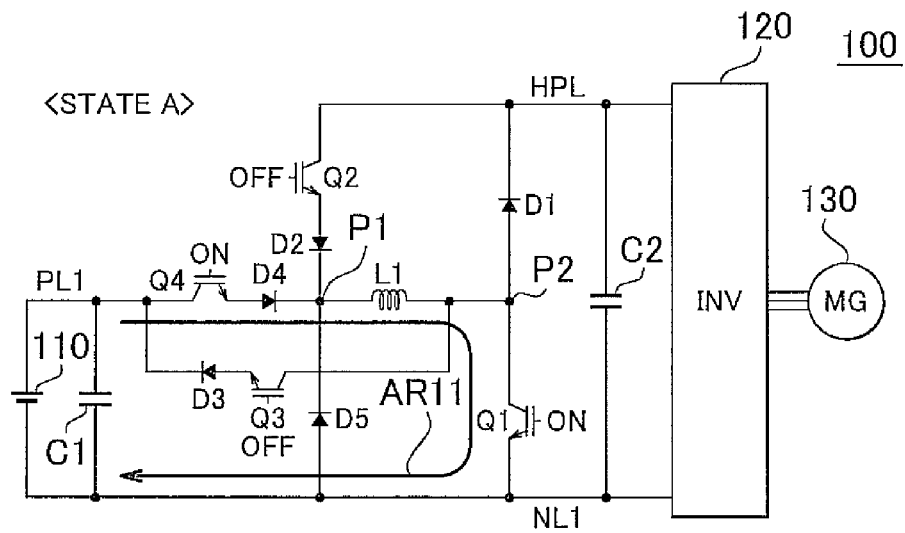
FIG. 10 is a first view for illustrating the operation of switching elements controlled by an ECU during power running and a current that flows through a circuit in the embodiment.

As shown in FIG. 10, initially, the switching elements Q1 and Q4 are set in an on state, and the switching elements Q2 and Q3 are set in an off state (state A). By so doing, a current flows as indicated by the arrow AR11, and energy is stored in the reactor L1. At this time, like the curve W21 between time t1 and time t2 and between time t4 and time t5 in FIG. 14, a reactor current IL that flows through the reactor L1 (that is, the field current If of the motor generator 130) increases.

Figure 11:
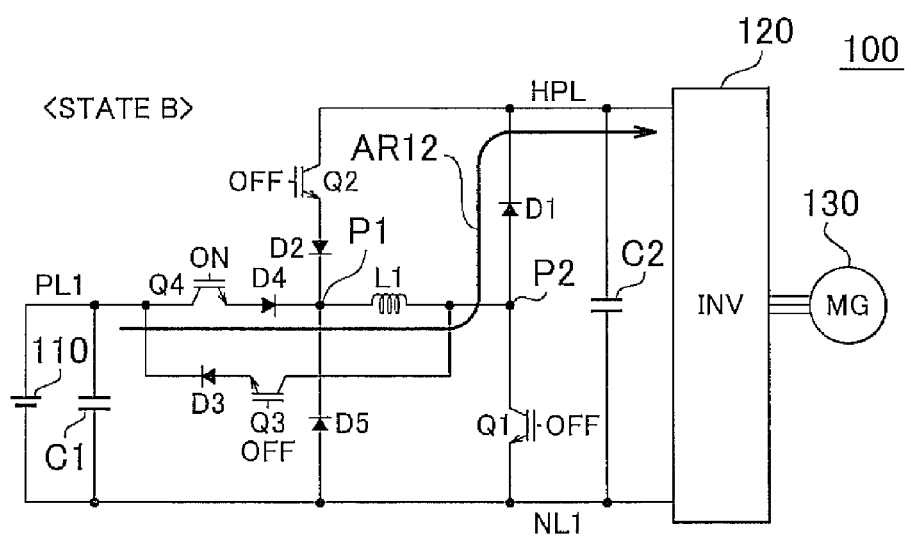
FIG. 11 is a second view for illustrating the operation of the switching elements controlled by the ECU during power running and a current that flows through the circuit in the embodiment.

Subsequently, like the state B shown in FIG. 11, the switching element Q1 is switched to an off state (that is, the switching elements Q1 to Q3 are set in an off state, and the switching element Q2 is set in an on state). Then, a current corresponding to energy stored in the reactor L1 flows from the reactor L1 toward the inverter 120 via the diode D1 as indicated by the arrow AR12. At this time, like between time t2 and time t3 and between time t5 and time t6 in FIG. 14, the reactor current IL gradually reduces as energy is discharged.

Figure 12:
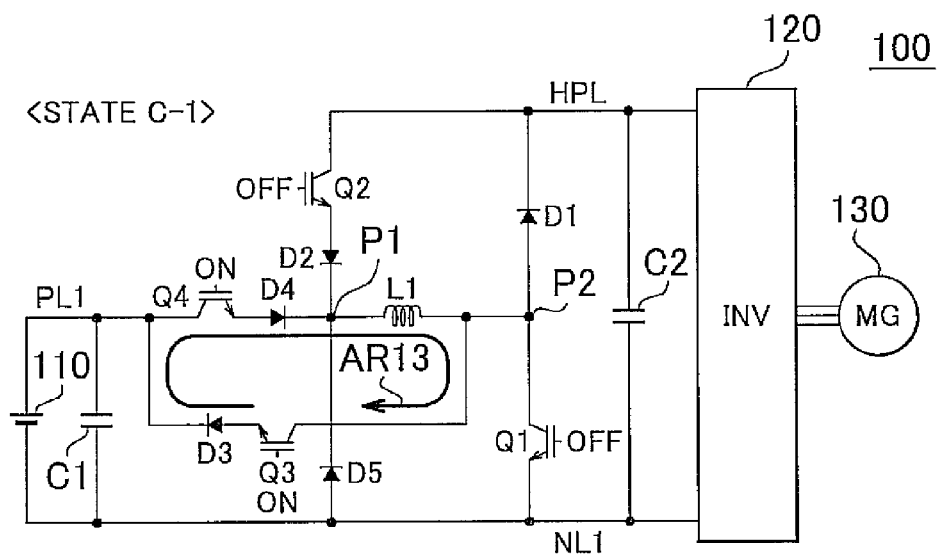
FIG. 12 is a third view for illustrating the operation of the switching elements controlled by the ECU during power running and a current that flows through the circuit in the embodiment.

After that, like the state C-1 shown in FIG. 12, the switching element Q3 is switched to an on state (that is, the switching elements Q1 and Q2 are set in an off state, and the switching elements Q3 and Q4 are set in an on state). Then, a cyclic current flows from the reactor L1 via the switching elements Q3 and Q4 back to the reactor L1 as indicated by the arrow AR13. At this time, like between time 0 and time t1 and between time t3 and time t4 in FIG. 14, the reactor current IL is maintained at substantially constant except conduction loss of the reactor L1, the switching elements Q3 and Q4, and the like.

By repeating the control period, an average current like the curve W24 shown in FIG. 14 is supplied to the motor generator 130 as the field current If. In addition, in the state B, the system voltage VH is stepped up by a current supplied from the reactor L1. Then, an electric power expressed by the product of the average current and the system voltage VH in the state B is supplied to the inverter 120.

Figure 13:
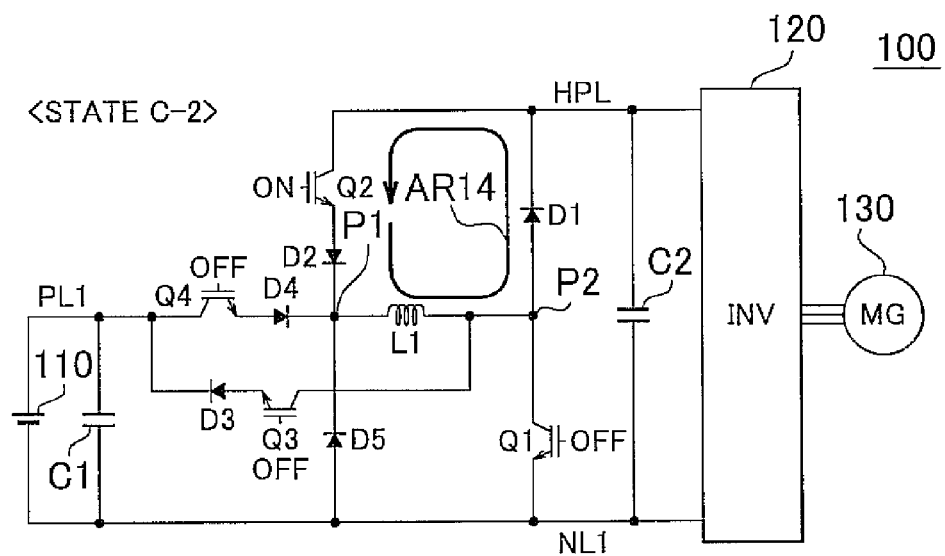
FIG. 13 is a fourth view for illustrating the operation of the switching elements controlled by the ECU during power running and a current that flows through the circuit in the embodiment.
Figures 14, 15:
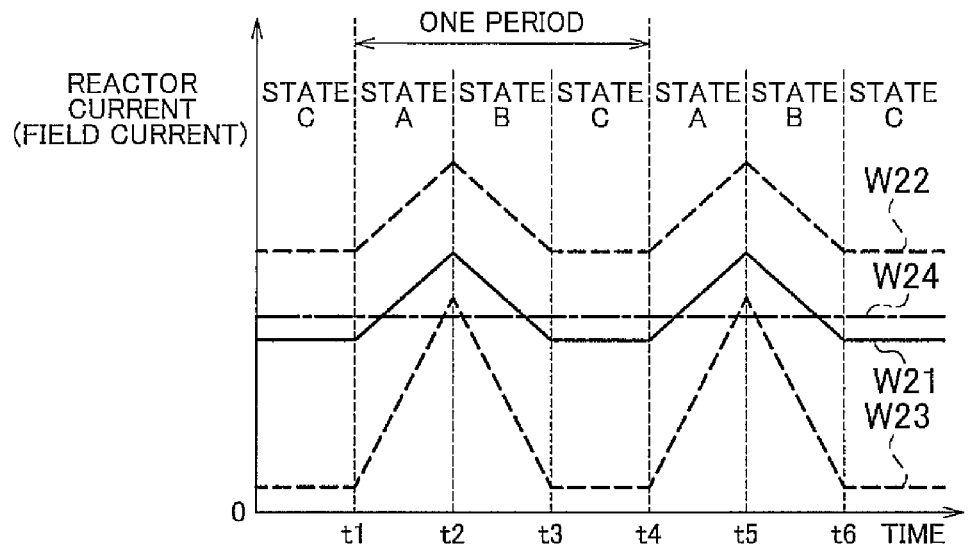
FIG. 14 is a time chart for illustrating a field current in a control period of switching control during power running.
FIG. 15 is a table that shows the statuses of the switching elements in each state during power running.

Note that the state C may be the state C-2 shown in FIG. 13. In this case, from the state B, the switching element Q2 is switched to an on state, and the switching element Q4 is switched to an off state (that is, the switching elements Q1, Q3 and Q4 are set in an off state, and the switching element Q2 is set in an on state). By so doing, as indicated by the arrow AR14, a cyclic current flows from the reactor L1 via the diode D1 and the switching element Q2 back to the reactor L1, so, as in the case of the state C-1, a current that flows through the reactor L1 may be maintained. However, the number of switching elements that are switched in transition from the state B is smaller in the state C-1, so it is more desirable.

In the above switching operation, when the duty ratios of the switching elements are appropriately set in the states A to C, the field current If and the step-up voltage may be separately regulated as indicated by the broken lines W22 and W23 in FIG. 14. Note that, in any state, the reactor current flows in the direction from point P1 to point P2 in the drawing.

On the other hand, the operation during regeneration will be described with reference to FIG. 16 to FIG. 21. FIG. 16 to FIG. 19 are views that show the operating statuses of the switching elements Q1 to Q4 during regeneration and a current that flows through the circuit at that time. During regeneration, as shown by the time chart of FIG. 20, the pattern from a state D to a state F is executed as one control period. Note that, as in the case of the state C during power running, two patterns, that is, a state F-1 (FIG. 18) and a state F-2 (FIG. 19), are shown as the state F, and any one of these two patterns may be employed. The statuses of the switching elements Q1 to Q4 in each state are shown in FIG. 21.

Figure 16:
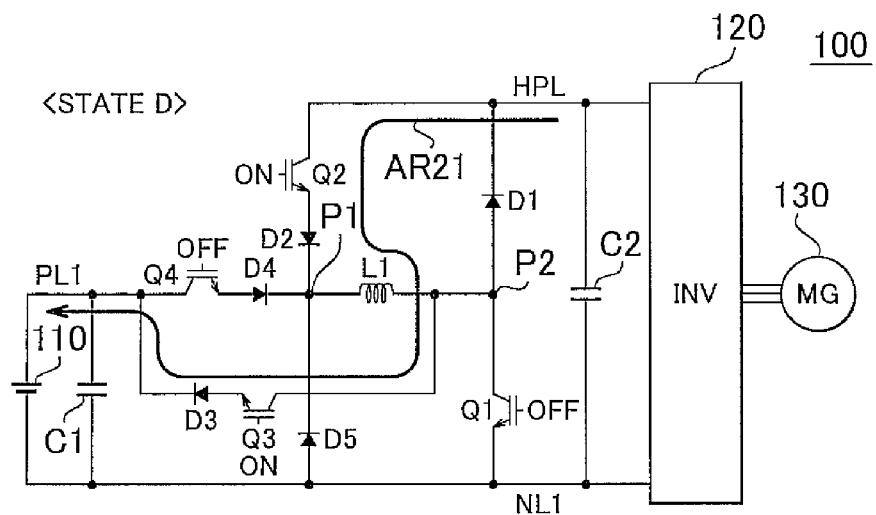
FIG. 16 is a first view for illustrating the operation of the switching elements controlled by the ECU during regeneration and a current that flows through the circuit in the embodiment.

As shown in FIG. 16, initially, the switching elements Q2 and Q3 are set in an on state, and the switching elements Q1 and Q4 are set in an off state (state D). By so doing, a current flows from the power line HPL via the switching element Q2, the reactor L1 and the switching element Q3 as indicated by the arrow AR21 to charge the power supply device 110, and energy is stored in the reactor L1. At this time, like the curve W31 between time t11 and time t12 and between time t14 and time t15 in FIG. 20, the reactor current IL (field current If) that flows through the reactor L1 increases.

Figure 17:
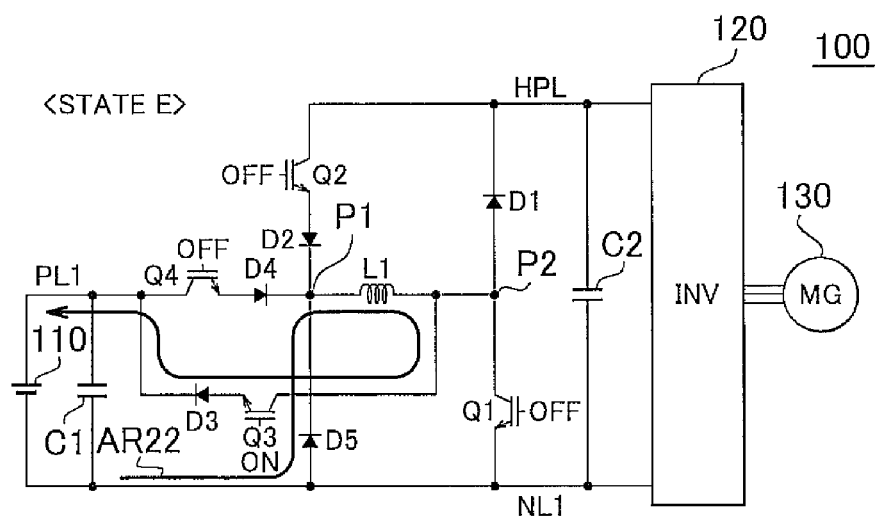
FIG. 17 is a second view for illustrating the operation of the switching elements controlled by the ECU during regeneration and a current that flows through the circuit in the embodiment.

Subsequently, like the state E shown in FIG. 17, the switching element Q2 is switched to an off state (that is, the switching elements Q1, Q2 and Q4 are set in an off state, and the switching element Q3 is set in an on state). Then, a current corresponding to energy stored in the reactor L1 flows from the reactor L1 toward the power supply device 110 via the switching element Q3 as indicated by the arrow AR22 to thereby continue charging. At this time, like between time t12 and time t13 and between time t15 and time t16 in FIG. 20, the reactor current IL gradually reduces as energy is discharged.

Figure 18:
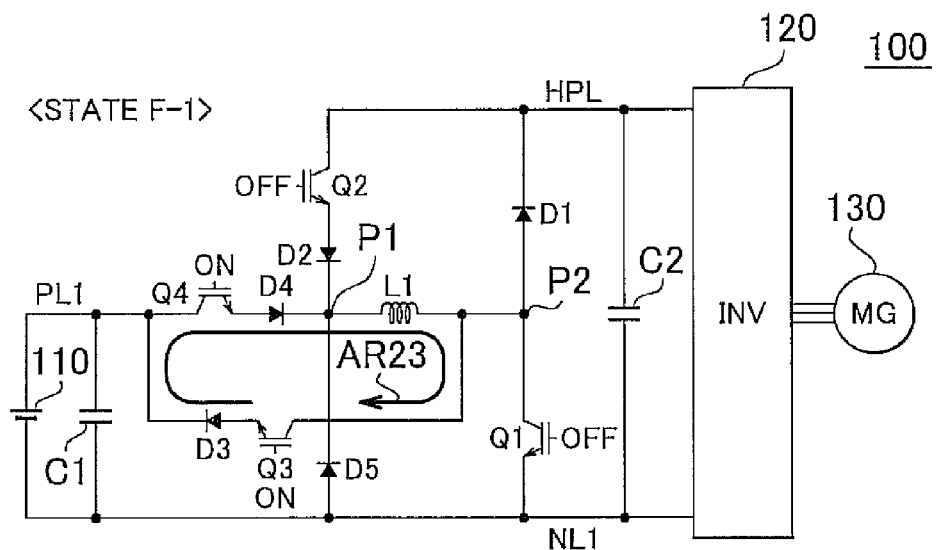
FIG. 18 is a third view for illustrating the operation of the switching elements controlled by the ECU during regeneration and a current that flows through the circuit in the embodiment.

After that, like the state F-1 shown in FIG. 18, the switching element Q4 is switched to an on state (that is, the switching elements Q1 and Q2 are set in an off state, and the switching elements Q3 and Q4 are set in an on state). Then, because the potential of the cathode (point P1 in the drawing) of the diode D5 is equal to the voltage of the power supply device 110, the current shown in FIG. 17 stops, and, as indicated by the arrow AR23, a cyclic current flows from the reactor L1 via the switching elements Q3 and Q4 back to the reactor L1. At this time, like between time 0 and time t11 and between time t13 and time t14 in FIG. 20, the reactor current IL is maintained at substantially constant.

By so doing, the average current indicated by the curve W34 in FIG. 20 is supplied to the motor generator 130 as the field current If. In addition, in the state D, the system voltage VH is stepped down by a current supplied from the power line HPL.

Figure 19:
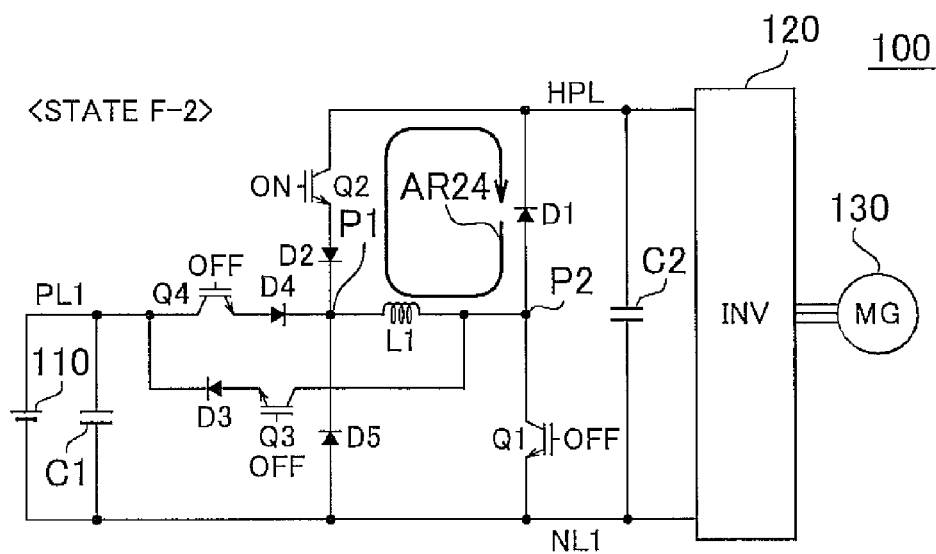
FIG. 19 is a fourth view for illustrating the operation of the switching elements controlled by the ECU during regeneration and a current that flows through the circuit in the embodiment.
Figures 20, 21:
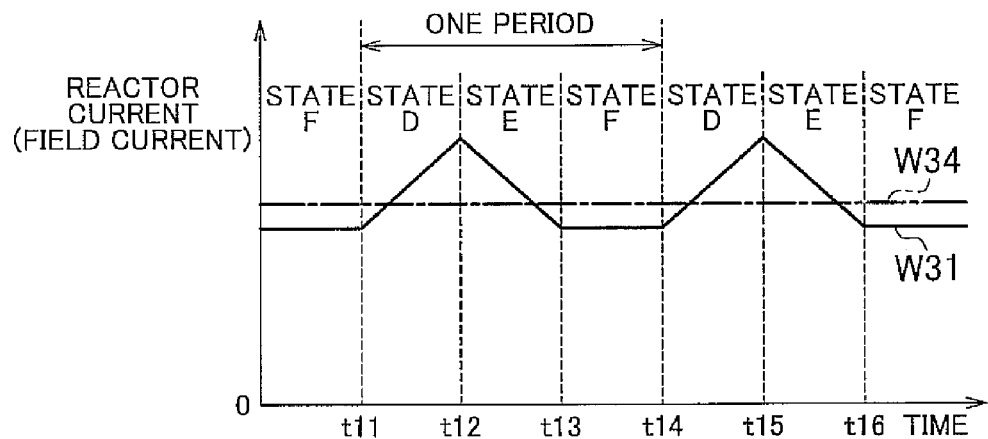
FIG. 20 is a time chart for illustrating a field current in a control period of switching control during regeneration.
FIG. 21 is a table that shows the statuses of the switching elements in each state during regeneration.

Note that the state F may be the state F-2 shown in FIG. 19 as described above. In this case, from the state E, the switching element Q2 is switched to an on state, and the switching element Q3 is switched to an off state (that is, the switching elements Q1, Q3 and Q4 are set in an off state, and the switching element Q2 is set in an on state). Then, when the potential of the anode of the diode D1 increases and then becomes higher than the potential of the power line HPL, the diode D1 conducts a current. By so doing, as indicated by the arrow AR24, a cyclic current flows from the reactor L1 via the diode D1 and the switching element Q2 back to the reactor L1, so, as in the case of the state F-1, a current that flows through the reactor L1 may be maintained. In this case as well, as in the case during power running, the number of switching elements that are switched in transition from the state E is smaller in the state F-1, so it is more desirable.

Figure 22:
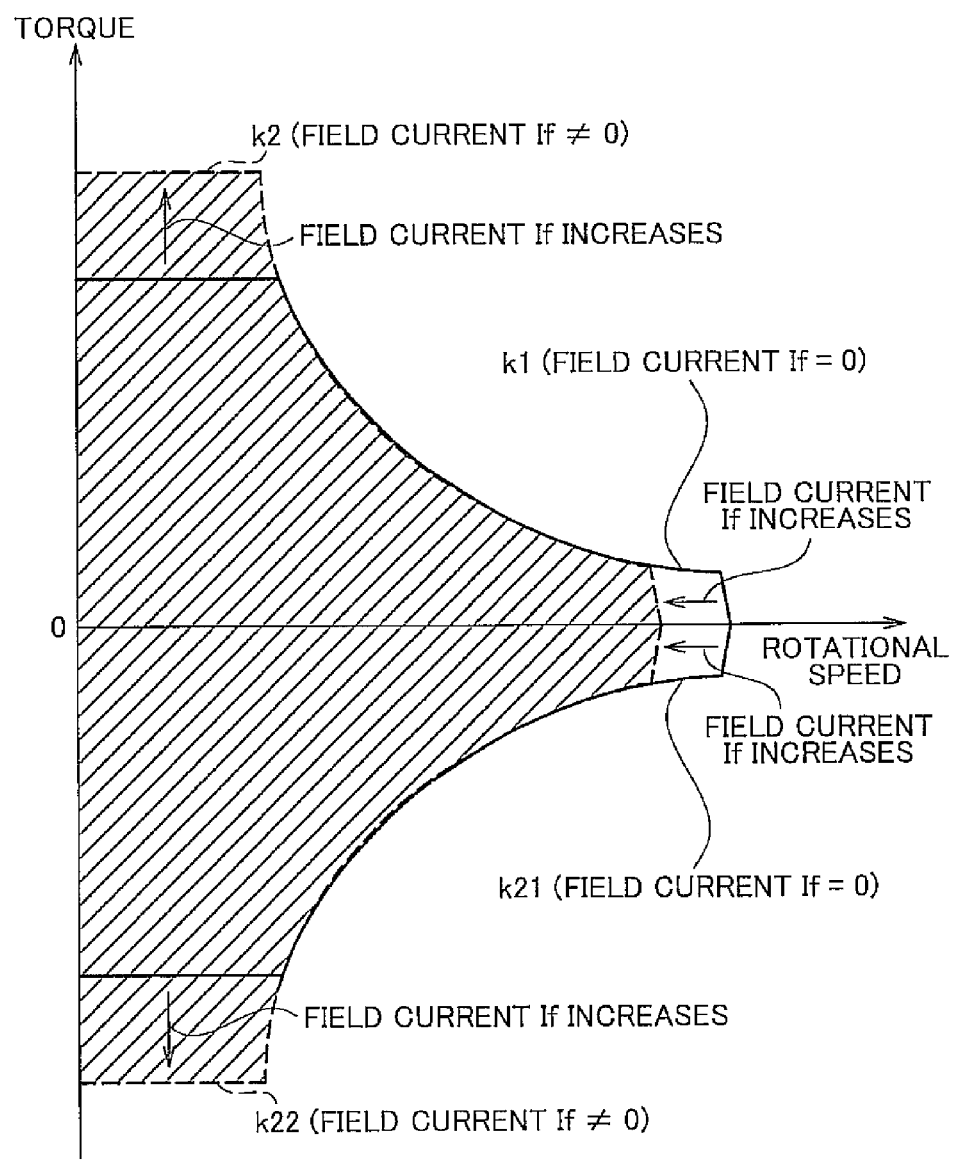
FIG. 22 is a graph that shows an example of the relationship between the torque and rotational speed of the motor generator according to the embodiment.

Note that, during regeneration as well, as shown in FIG. 16 to FIG. 19, in any of the states D to F, a current flows in the direction from point P1 to point P2 in the drawing. That is, both during power running and during regeneration, the direction of the magnetic lines of force generated by the field current If becomes a direction to increase the strength of the magnetic lines of force generated by the magnets of the rotor. Thus, as shown in FIG. 22, in any of during power running and during regeneration, the field current If is increased to make it possible to increase generated torque in the low rotational speed range. By so doing, it is possible to increase torque and improve efficiency through reduction of loss not only during power running but also during regeneration. Note that a current path along which a current flows in the states A to C and a current path along which a current flows in the states D to F are respectively examples of "first current path" and "second current path" according to the aspect of the invention.

FIG. 23 is a functional block diagram for illustrating switching control executed by the ECU 300 in the present embodiment. The functional blocks shown in the functional block diagram of FIG. 23 are implemented through hardware processing or software processing by the ECU 300.

As shown in FIG. 1 and FIG. 23, the ECU 300 includes a target setting unit 310, a duty setting unit 320 and a control signal setting unit 330.

The target setting unit 310 receives a torque command value TR of the motor generator 130 from a higher-level ECU (not shown) and a rotational speed MRN of the motor generator 130, detected by a rotation sensor (not shown). Then, the target setting unit 310 uses a predetermined map, or the like, to set the target value VH* of the system voltage VH and the target value If of the field current If on the basis of these pieces of information and then outputs the set values to the duty setting unit 320.

The duty setting unit 320 receives the target values VH* and If set by the target setting unit 310 and the detected voltages VL and VH from the voltage sensors 150 and 160. The duty setting unit 320 sets the duty ratios of the switching elements Q1 to Q4 included in the converter 115 and the duty ratios of the switching elements Q15 to Q20 included in the inverter 120 for achieving the target values VH* and If* on the basis of these pieces of information. Then, set duty ratio commands DUTY are output to the control signal setting unit 330.

The control signal setting unit 330 generates the control signals SE1 to SE4 and PWI in accordance with the duty ratio commands DUTY from the duty setting unit 320, and then outputs the control signals SE1 to SE4 and PWI to the converter 115 and the inverter 120.

FIG. 24 is a flowchart for illustrating the details of switching control process executed by the ECU 300 in the present embodiment. Steps in the flowchart shown in FIG. 24 are implemented so that a program prestored in the ECU 300 is called from a main routine and executed at a predetermined interval. Alternatively, the processes of part of steps may be implemented by constructing exclusive hardware (electronic circuit).

As shown in FIG. 1 and FIG. 24, the ECU 300 acquires the torque command value TR and motor rotational speed MRN of the motor generator 130 in step (hereinafter, step is abbreviated to S) 100. In addition, in S110, the ECU 300 acquires the voltages VL and VH detected by the voltage sensors 150 and 160. At this time, the ECU 300 determines whether a control mode is power running or regeneration.

Subsequently, in S120, the ECU 300 sets the target value VH* of the system voltage VH and the target value If* of the field current If on the basis of the acquired motor required outputs (TR, MRN) by referring to, for example, a map, or the like.

Then, in S130, the ECU 300 computes the duty ratios of the switching elements included in the converter 115 and the inverter 120 on the basis of the target values VH* and If*, the actual values VL and VH detected by the sensors, the control mode of power running or regeneration, and the like.

Then, in S140, the ECU 300 carries out switching control of the switching elements in accordance with the set duty ratios.

By carrying out control in accordance with the above process, voltage conversion of the converter 115 and magnetic field control of the motor generator 130 may be carried out separately, and it is possible to pass the field current through the field coil 50 in the same direction both during power running and during regeneration. By so doing, in the electric motor driving device, it is possible to increase torque and reduce loss both during power running and during regeneration while suppressing an increase in size of the electric motor.

Figure 25:
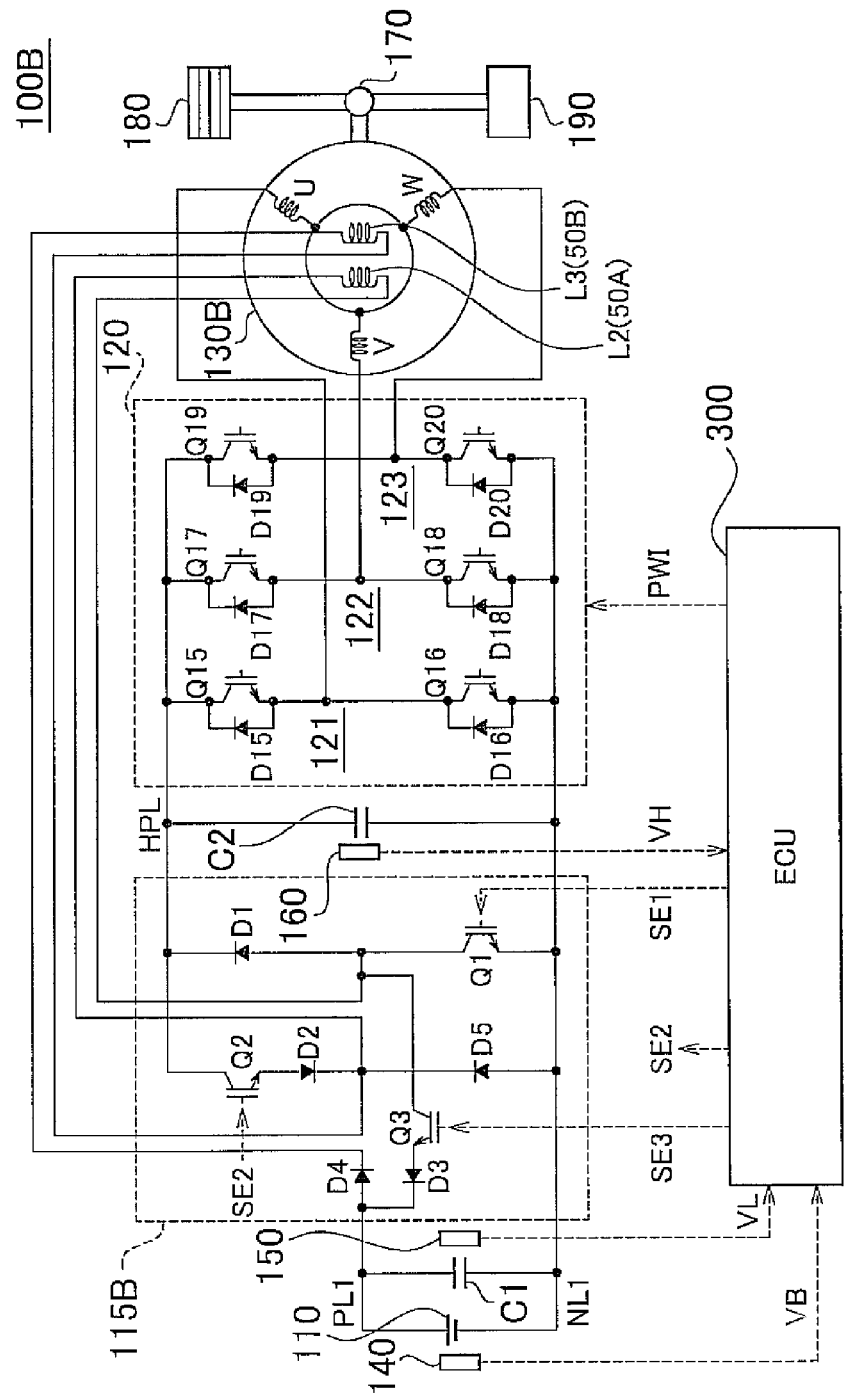
FIG. 25 is an overall block diagram of a vehicle equipped with an electric motor driving device according to an alternative example of the embodiment.

An alternative example of the present embodiment will be described below. FIG. 25 is an overall block diagram of a vehicle 100B equipped with an electric motor driving device of another example according to the present embodiment. In FIG. 25, the converter 115 shown in FIG. 1 is replaced with a converter 115B, and, in addition, the motor generator 130 is replaced with a motor generator 130B. In FIG. 25, the description of components that overlap those of FIG. 1 is not repeated.

The basic structure of the motor generator 130B is the same as that of the motor generator 130 shown in FIG. 2 to FIG. 5. However, in the motor generator 130, the field coils 50A and 50B connected in series with each other in the motor generator 130 are connected to the converter 115; whereas, in the motor generator 130B, the field coils 50A and 50B are separately connected to the converter 115B.

In the converter 115B, a reactor L2 that is the field coil 50A is connected at the position of the reactor L1 in the converter 115 shown in FIG. 1. Then, a reactor L3 that is the field coil 50B is connected between the cathode of the diode D2 and the cathode of the diode D4. In addition, in the converter 115B, the switching element Q4 is omitted, and the anode of the diode D4 is connected to the power line PL1. The remaining components, that is, the switching elements Q1 to Q3 and the diodes D1 to D3 and D5 are connected as in the case of the converter 115.

With the above configuration, it is possible to omit the switching element Q4 from the converter. Note that the reactors L2 and L3 may be basically configured to have substantially the same reactance so as not to cause imbalance of magnetic flux generated inside the motor generator 130B.

The switching statuses of the switching elements of the converter 115B and the state of a current that flows through the circuit in FIG. 25 will be described with reference to FIG. 26 to FIG. 33. Note that FIG. 26 to FIG. 29 show cases during power running and FIG. 30 to FIG. 33 show cases during regeneration.

Figure 26:
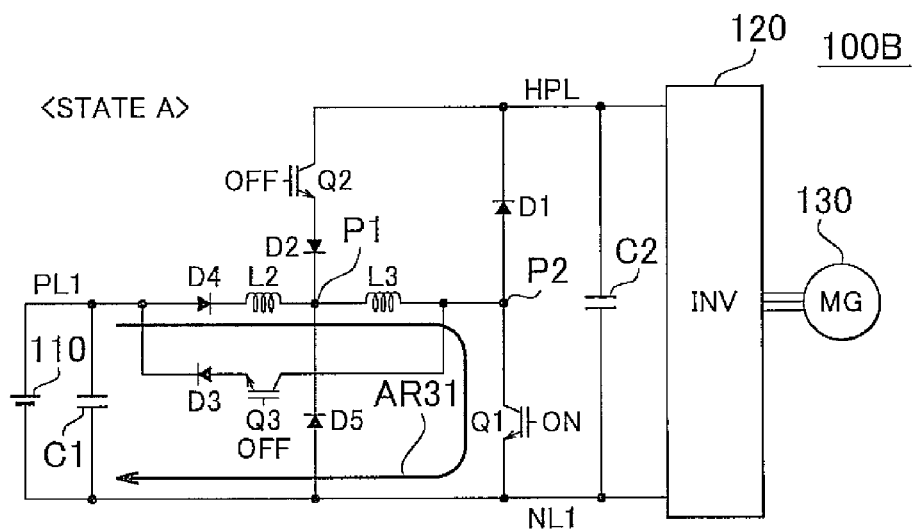
FIG. 26 is a first view for illustrating the operation of switching elements controlled by an ECU during power running and a current that flows through a circuit in the alternative example.

FIG. 26 is a case corresponding to the state A shown in FIG. 10. In this case, the switching element Q1 is set in an on state, and the switching elements Q2 and Q3 are set in an off state. At this time, a current flows through the circuit as indicated by the arrow AR31, and energy is stored in the reactors L2 and L3.

Figure 27:
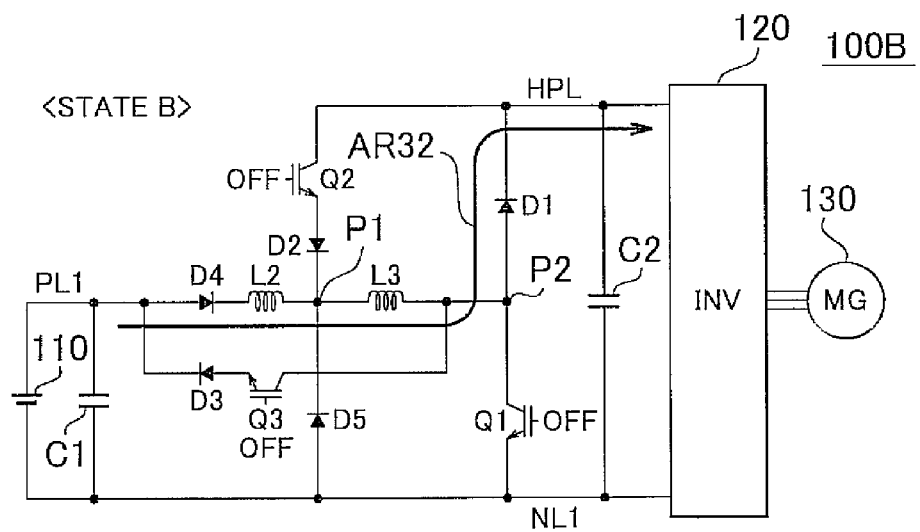
FIG. 27 is a second view for illustrating the operation of the switching elements controlled by the ECU during power running and a current that flows through the circuit in the alternative example.

Subsequently, in FIG. 27, as in the case of the state B shown in FIG. 11, the switching element Q1 is switched to an off state, and all the switching elements Q1 to Q3 are set in an off state. At this time, a current corresponding to the energy stored in the reactors L2 and L3 is supplied toward the inverter 120 via the diode D1.

Figures 28, 29:
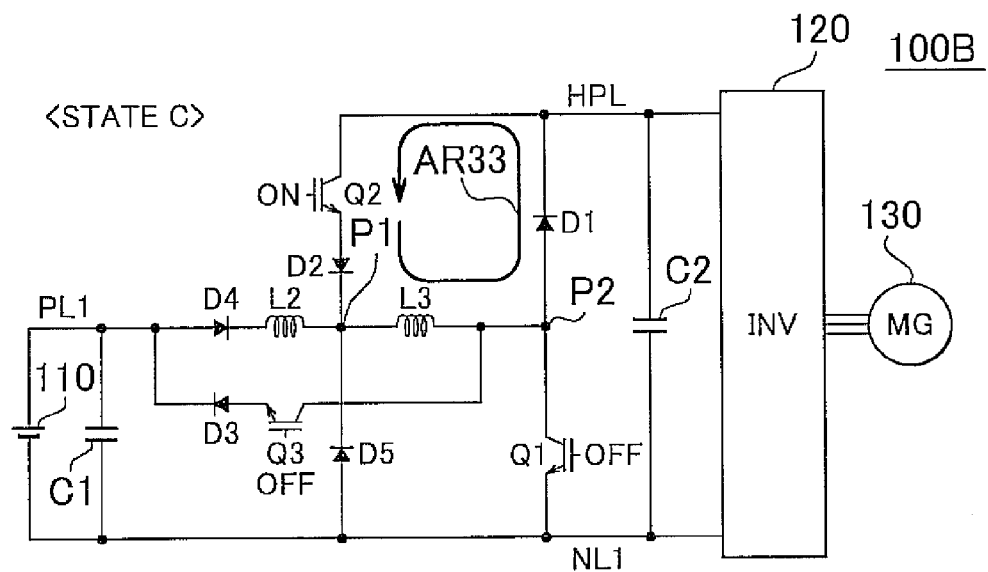
FIG. 28 is a third view for illustrating the operation of the switching elements controlled by the ECU during power running and a current that flows through the circuit in the alternative example.
FIG. 29 is a table that shows the statuses of the switching elements in each state during power running in the alternative example.

Then, in FIG. 28, the switching element Q2 is switched to an on state. By so doing, as in the case of the state C-2 shown in FIG. 13, a cyclic current (arrow AR33 in FIG. 28) flows from the reactor L3 via the diode D1 and the switching element Q2 back to the reactor L3. After that, the state returns to the state A again to start the next switching cycle.

FIG. 29 shows the switching statuses of the switching elements Q1 to Q3 during power running. Note that, although not shown in the drawing, in the state C, as in the case of the state C-1 shown in FIG. 12, the switching element Q3 may be set in an on state to pass a cyclic current that flows from the reactor L3 via the switching element Q3, the diode D4 and the reactor L2 back to the reactor L3.

Figure 30:
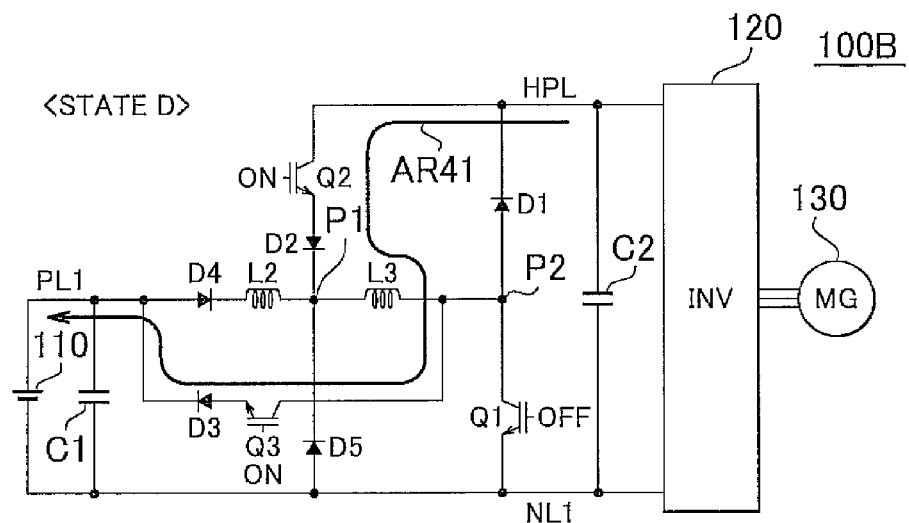
FIG. 30 is a first view for illustrating the operation of the switching elements controlled by the ECU during regeneration and a current that flows through the circuit in the alternative example.

Next, the operation during regeneration will be described with reference to FIG. 30 to FIG. 33. FIG. 30 is a case corresponding to the state D shown in FIG. 16. In this case, the switching element Q1 is set in an off state, and the switching elements Q2 and Q3 are set in an on state. At this time, a current flows as indicated by the arrow AR41, and energy is stored in the reactor L3. Note that, in this case, the potential at point P1 in the drawing is higher than the potential of the power line PL1, so no current flows through the reactor L2.

Figure 31:
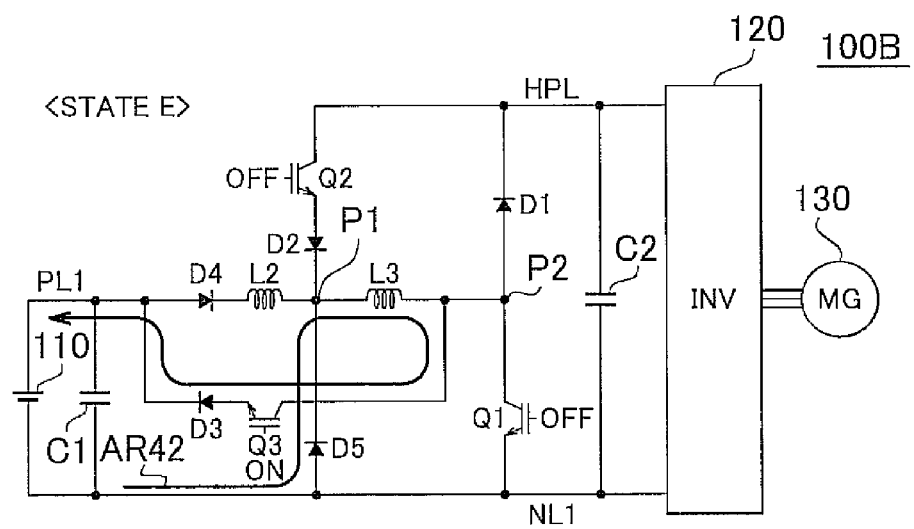
FIG. 31 is a second view for illustrating the operation of the switching elements controlled by the ECU during regeneration and a current that flows through the circuit in the alternative example.

Subsequently, in FIG. 31, as in the case of the state E shown in FIG. 17, the switching element Q2 is switched to an off state, the switching elements Q1 and Q2 are set in an off state, and the switching element Q3 is set in an on state. By so doing, energy stored in the reactor L3 is discharged, and a current continuously flows from the reactor L3 to the power supply device 110 via the switching element Q3 (arrow AR42 in FIG. 31).

Figures 32, 33:
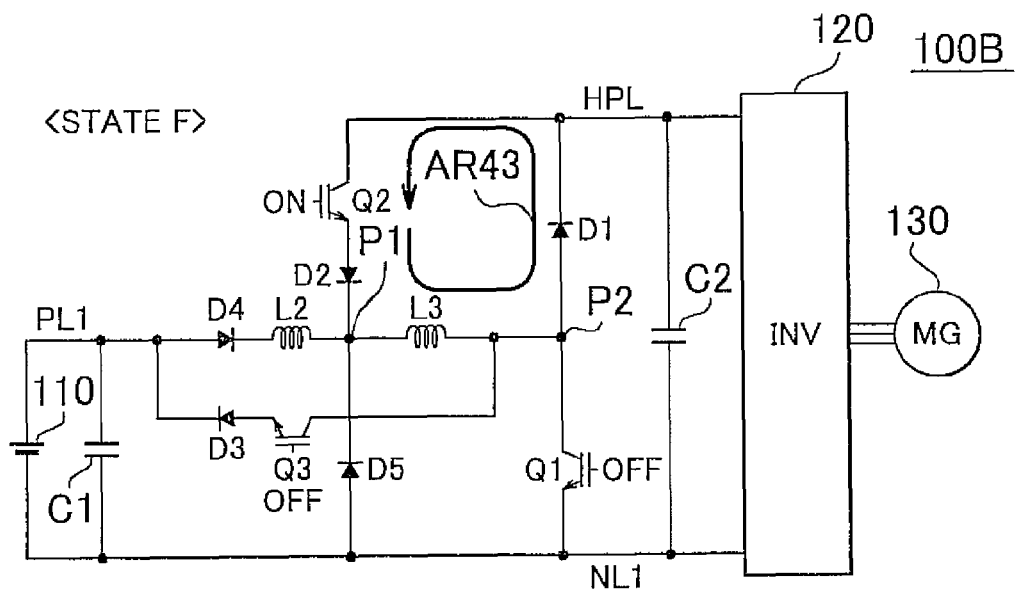
FIG. 32 is a third view for illustrating the operation of the switching elements controlled by the ECU during regeneration and a current that flows through the circuit in the alternative example.
FIG. 33 is a table that shows the statuses of the switching elements in each state during regeneration in the alternative example.

Then, in FIG. 32, the switching element Q3 is switched to an off state. By so doing, as in the case of the state F-2 shown in FIG. 19, a cyclic current (arrow AR43 in FIG. 32) flows from the reactor L3 via the diode D1 and the switching element Q2 back to the reactor L3.

FIG. 33 shows the switching statuses of the switching elements Q1 to Q3 during regeneration. Note that energy is not stored in the reactor L2 during regeneration, so the state F-1 shown in FIG. 20 cannot be achieved.

As described above, in the configuration of the alternative example shown in FIG. 25 as well, it is possible to pass the field current in the same direction both during power running and during regeneration. In the alternative example, in part of the states, a current flows through the reactor L3 but a current does not flow through the reactor L2, so energy may be smaller than that of the configuration shown in FIG. 1. Then, an increase in torque caused by passing the field current may be smaller. However, on the other hand, the switching element Q4 may be omitted to thereby make it possible to omit a device and a control, so it is possible to reduce the overall cost.

Note that the "switching element Q1" in the present embodiment is an example of a "step-up switching element" according to the aspect of the invention. The "switching element Q2", "switching element Q3" and "switching element Q4" are respectively examples of a "first switching element", a "second switching element" and a "third switching element" according to the aspect of the invention. In addition, the "diode D1", "diode D5" and "diode D4" are respectively examples of a "first rectifying element", a "second rectifying element" and a "third rectifying element" according to the aspect of the invention. The "power line PL1" and "power line HPL" are respectively examples of a "first power line" and a "second power line" according to the aspect of the invention.

Hereinafter, the outline of the above described embodiment of the invention will be described below.

The present embodiment relates to an electric motor driving device that drives an electric motor that includes a field winding, a rotor and a stator, wherein the rotor and the stator each form a field pole by passing a field current through the field winding. The electric motor driving device includes a power supply device; a converter that includes a reactor that at least partially serves as the field winding to share the field winding with the electric motor, and that is configured to receive a voltage from the power supply device to carry out voltage conversion between a first power line and a second power line and to pass the field current through the field winding during operation of the voltage conversion; an inverter that is configured to receive a direct-current power from the converter and to convert the direct-current power to an alternating-current power for driving the electric motor; and a controller that controls the converter so that a current flows through the field winding in the same direction both during power running of the electric motor and during regeneration of the electric motor.

In the electric motor driving device according to the present embodiment, the converter may include a switching unit that switches between a first current path along which a current flows during power running of the electric motor and a second current path along which a current flows during regeneration of the electric motor, and the controller may control the switching unit so that a current flows through the field winding in the same direction both when a current flows along the first current path and when a current flows along the second current path.

In the electric motor driving device according to the present embodiment, the switching unit may be connected between a first end that is one end of the field winding and a negative electrode of the power supply device so that a direction from the field winding toward the negative electrode of the power supply device is set as a forward direction, the switching unit may include a step-up switching element that is used to step up the voltage from the power supply device and a field switching element that controls a current flowing through the field winding, a second end that is the other end of the field winding may be electrically connected to the first power line, and the controller may carry out switching control of the step-up switching element and the field switching element to control the field current to thereby regulate a magnetic flux density between the rotor and the stator and to control a step-up current output from the converter to the second power line to thereby convert the voltage from the power supply device to a voltage according to a target value of a step-up voltage.

In the electric motor driving device according to the present embodiment, the controller may include a target setting unit that sets a target value of the field current and a target value of the step-up voltage in accordance with a rotational speed and required torque of the electric motor, a duty setting unit that sets a duty ratio of the step-up switching element and a duty ratio of the field switching element on the basis of the target value of the field current and the target value of the step-up voltage, and a control signal setting unit that sets control signals for switching the step-up switching element and the field switching element in accordance with the set duty ratios.

In the electric motor driving device according to the present embodiment, the field switching element may include a first switching element that is connected between the second power line and the second end of the field winding so that a direction from the second power line toward the second end is set as a forward direction, a second switching element that is connected between the first end and the first power line so that a direction from the first end toward the first power line is set as a forward direction and a third switching element that is connected between the first power line and the second end so that a direction from the first power line toward the second end is set as a forward direction, and the converter may include a first rectifying element that is connected between the first end and the second power line so that a direction from the first end toward the second power line is set as a forward direction and a second rectifying element that is connected between the second end and a negative electrode of the power supply device so that a direction from the negative electrode of the power supply device toward the second end is set as a forward direction.

In the electric motor driving device according to the present embodiment, the converter may step up the voltage from the power supply device on the basis of the control signal corresponding to the duty ratio of the step-up switching element during power running of the electric motor, and may step down a voltage from the inverter on the basis of the control signal corresponding to the duty ratio of the first switching element during regeneration of the electric motor.

In the electric motor driving device according to the present embodiment, the converter may have a first state that increases a current flowing through the field winding, a second state that reduces a current flowing through the field winding and a third state that maintains a current flowing through the field winding, and, in the third state, the duty setting unit may set the duty ratios so as to set the step-up switching element and the first switching element in an off state and to set the second switching element and the third switching element in an on state.

In the electric motor driving device according to the present embodiment, the converter may have a first state that increases a current flowing through the field winding, a second state that reduces a current flowing through the field winding and a third state that maintains a current flowing through the field winding, and, in the third state, the duty setting unit may set the duty ratios so as to set the step-up switching element, the second switching element and the third switching element in an off state and to set the first switching element in an on state.

In the electric motor driving device according to the present embodiment, the field winding may include a first field winding and a second field winding that are connected in series with each other, the field switching element may include a first switching element that is connected between the second power line and a connection node of the first field winding and the second field winding so that a direction from the second power line toward the connection node is set as a forward direction and a second switching element that is connected between the first end and the first power line so that a direction from the first end toward the first power line is set as a forward direction, and the converter may include a first rectifying element that is connected between the first end and the second power line so that a direction from the first end toward the second power line is set as a forward direction, a second rectifying element that is connected between a negative electrode of the power supply device and the connection node so that a direction from the negative electrode of the power supply device toward the connection node is set as a forward direction and a third rectifying element that is connected between the first power line and the second end so that a direction from the first power line toward the second end is set as a forward direction.

In the electric motor driving device according to the present embodiment, a reactance of the first field winding may be equal to a reactance of the second field winding. In the electric motor driving device according to the present embodiment, the converter may step up the voltage from the power supply device on the basis of the control signal corresponding to the duty ratio of the step-up switching element, and may step down the voltage from the inverter on the basis of the control signal corresponding to the duty ratio of the first switching element.

In the electric motor driving device according to the present embodiment, the converter may have a first state that increases a current flowing through the field winding, a second state that reduces a current flowing through the field winding and a third state that maintains a current flowing through the field winding, and, in the third state, the duty setting unit may set the duty ratios so as to set the step-up switching element and the second switching element in an off state and to set the first switching element in an on state.

In addition, the present embodiment relates to a vehicle that includes: an electric motor that includes a field winding, a rotor and a stator, wherein the rotor and the stator each form a field pole by passing a field current through the field winding; an electric motor driving device that includes a power supply device, a converter that includes a reactor that at least partially serves as the field winding to share the field winding with the electric motor and that is configured to receive a voltage from the power supply device to carry out voltage conversion between a first power line and a second power line and to pass the field current through the field winding during operation of the voltage conversion, an inverter that is configured to receive a direct-current power from the converter and to convert the direct-current power to an alternating-current power for driving the electric motor, and a controller that controls the converter so that a current flows through the field winding in the same direction both during power running of the electric motor and during regeneration of the electric motor, wherein the electric motor driving device drives the electric motor; and a driving wheel that allows the vehicle to run by rotational force from the electric motor.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. An electric motor driving device that drives an electric motor that includes a field winding, a rotor and a stator, wherein the rotor and the stator each form a field pole by passing a field current through the field winding, the electric motor driving device comprising:
   a power supply device;
   a converter that includes a reactor that at least partially serves as the field winding to share the field winding with the electric motor, and that is configured to receive a voltage from the power supply device to carry out voltage conversion between a first power line and a second power line and to pass the field current through the field winding during operation of the voltage conversion;
   an inverter that is configured to receive a direct-current power from the converter and to convert the direct-current power to an alternating-current power for driving the electric motor; and
   a controller that controls the converter so that a current flows through the field winding in the same direction both during power running of the electric motor and during regeneration of the electric motor,
   wherein the converter includes a switching unit that switches between a first current path along which a current flows during power running of the electric motor and a second current path along which a current flows during regeneration of the electric motor, and
   the controller controls the switching unit so that a current flows through the field winding in the same direction both when a current flows along the first current path and when a current flows along the second current path,
   wherein the switching unit is connected between a first end that is one end of the field winding and a negative electrode of the power supply device so that a direction from the field winding toward the negative electrode of the power supply device is set as a forward direction,
   the switching unit includes a step-up switching element that is used to step up the voltage from the power supply device and a field switching element that controls a current flowing through the field winding,
   a second end that is the other end of the field winding is electrically connected to the first power line, and
   the controller carries out switching control of the step-up switching element and the field switching element to control the field current to thereby regulate a magnetic flux density between the rotor and the stator and to control a step-up current output from the converter to the second power line to thereby convert the voltage from the power supply device to a voltage according to a target value of a step-up voltage.

2. The electric motor driving device according to claim 1, wherein
   the controller includes
   a target setting unit that sets a target value of the field current and the target value of the step-up voltage in accordance with a rotational speed and required torque of the electric motor,
   a duty setting unit that sets a duty ratio of the step-up switching element and a duty ratio of the field switching element on the basis of the target value of the field current and the target value of the step-up voltage, and
   a control signal setting unit that sets control signals for switching the step-up switching element and the field switching element in accordance with the set duty ratios.

3. The electric motor driving device according to claim 2, wherein
   the field switching element includes a first switching element that is connected between the second power line and the second end of the field winding so that a direction from the second power line toward the second end is set as a forward direction, a second switching element that is connected between the first end and the first power line so that a direction from the first end toward the first power line is set as a forward direction and a third switching element that is connected between the first power line and the second end so that a direction from the first power line toward the second end is set as a forward direction, and the converter includes a first rectifying element that is connected between the first end and the second power line so that a direction from the first end toward the second power line is set as a forward direction and a second rectifying element that is connected between the second end and the negative electrode of the power supply device so that a direction from the negative electrode of the power supply device toward the second end is set as a forward direction.

4. The electric motor driving device according to claim 3, wherein the converter steps up the voltage from the power supply device on the basis of the control signal corresponding to the duty ratio of the step-up switching element during power running of the electric motor, and the converter steps down a voltage from the inverter on the basis of the control signal corresponding to the duty ratio of the first switching element during regeneration of the electric motor.

5. The electric motor driving device according to claim 3, wherein the converter has a first state that increases a current flowing through the field winding, a second state that reduces a current flowing through the field winding and a third state that maintains a current flowing through the field winding, and in the third state, the duty setting unit sets the duty ratios so as to set the step-up switching element and the first switching element in an off state and to set the second switching element and the third switching element in an on state.

6. The electric motor driving device according to claim 3, wherein the converter has a first state that increases a current flowing through the field winding, a second state that reduces a current flowing through the field winding and a third state that maintains a current flowing through the field winding, and in the third state, the duty setting unit sets the duty ratios so as to set the step-up switching element, the second switching element and the third switching element in an off state and to set the first switching element in an on state.

7. The electric motor driving device according to claim 2, wherein the field winding includes a first field winding and a second field winding that are connected in series with each other, the field switching element includes a first switching element that is connected between the second power line and a connection node of the first field winding and the second field winding so that a direction from the second power line toward the connection node is set as a forward direction and a second switching element that is connected between the first end and the first power line so that a direction from the first end toward the first power line is set as a forward direction, and the converter includes a first rectifying element that is connected between the first end and the second power line so that a direction from the first end toward the second power line is set as a forward direction, a second rectifying element that is connected between the negative electrode of the power supply device and the connection node so that a direction from the negative electrode of the power supply device toward the connection node is set as a forward direction and a third rectifying element that is connected between the first power line and the second end so that a direction from the first power line toward the second end is set as a forward direction.

8. The electric motor driving device according to claim 7, wherein a reactance of the first field winding is equal to a reactance of the second field winding.

9. The electric motor driving device according to claim 7, wherein the converter steps up the voltage from the power supply device on the basis of the control signal corresponding to the duty ratio of the step-up switching element, and steps down the voltage from the inverter on the basis of the control signal corresponding to the duty ratio of the first switching element.

10. The electric motor driving device according to claim 7, wherein the converter has a first state that increases a current flowing through the field winding, a second state that reduces a current flowing through the field winding and a third state that maintains a current flowing through the field winding, and in the third state, the duty setting unit sets the duty ratios so as to set the step-up switching element and the second switching element in an off state and to set the first switching element in an on state.

* * * * *